INVENTORS
Robert J. Kalthoff
Frederick R. Sanborn
Robert D. Parry
BY
Wood, Herron & Evans
ATTORNEYS

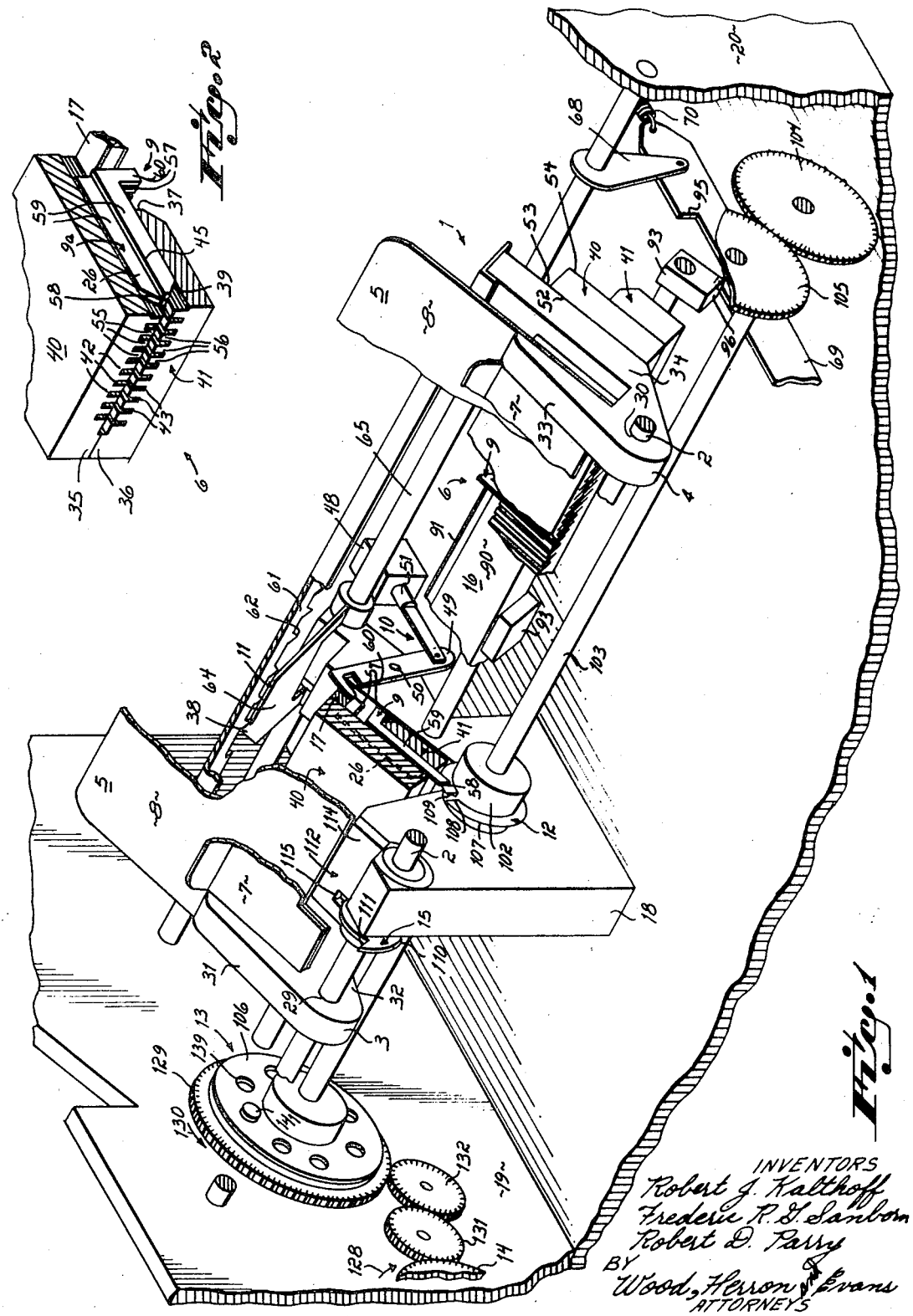

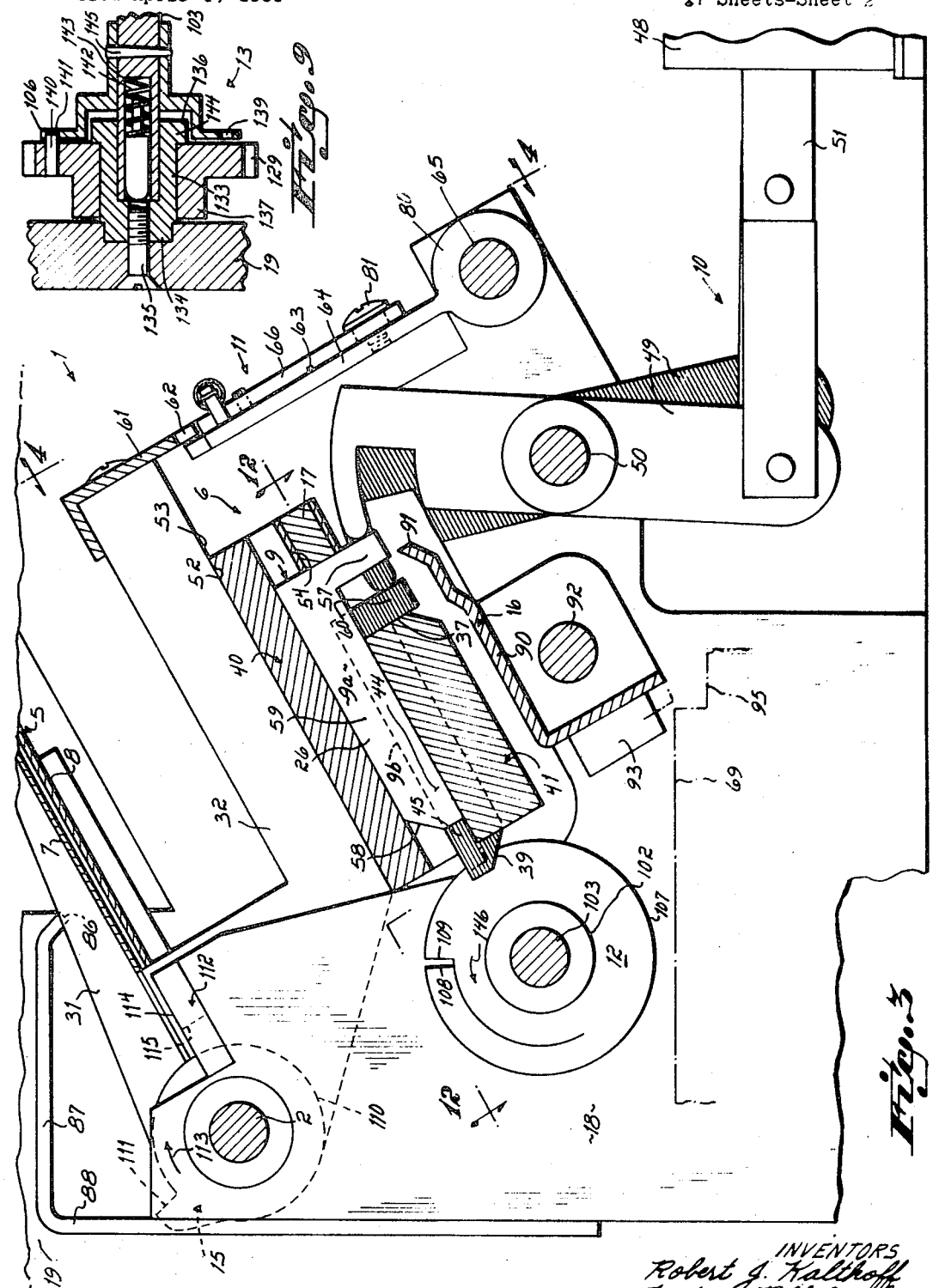

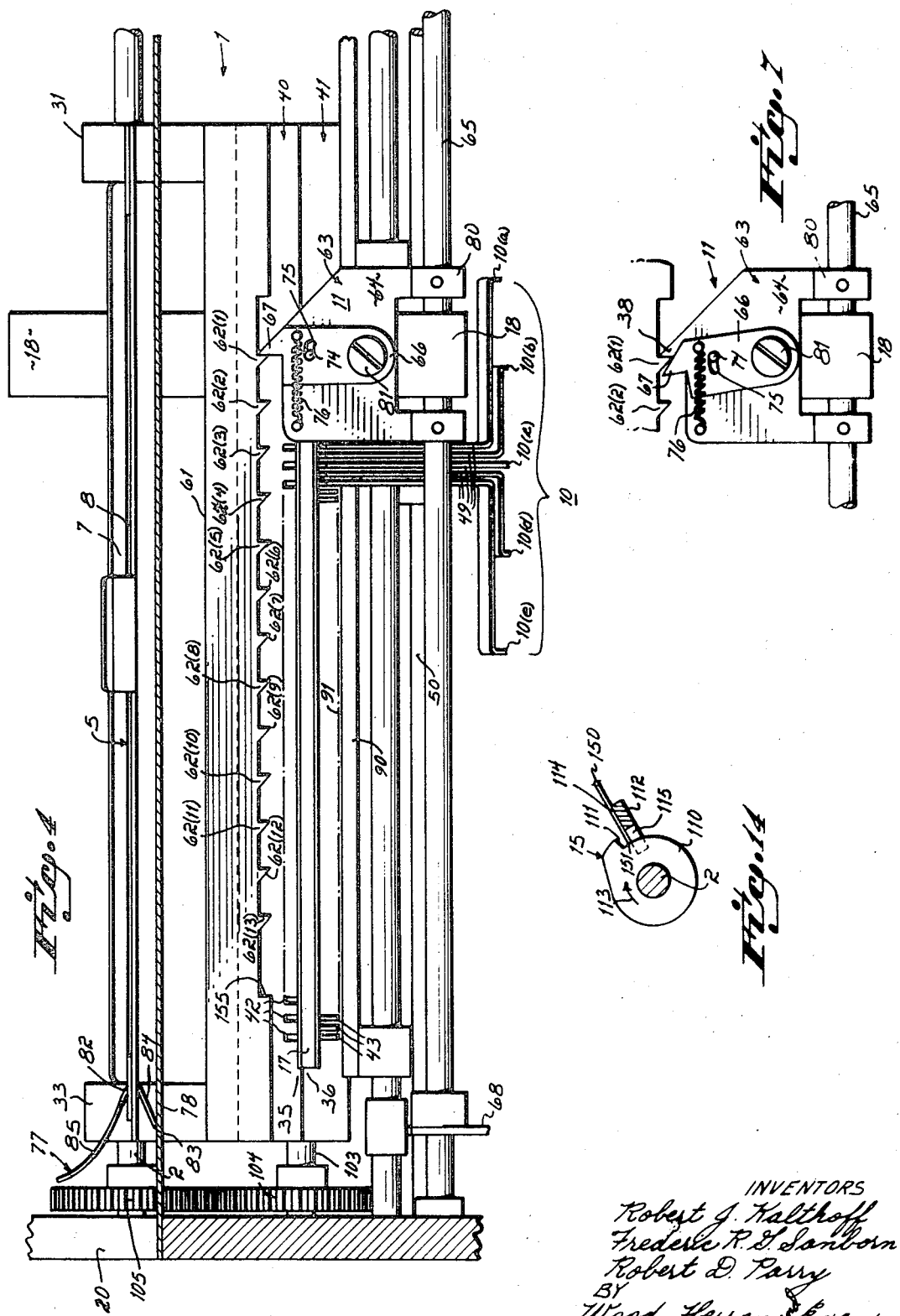

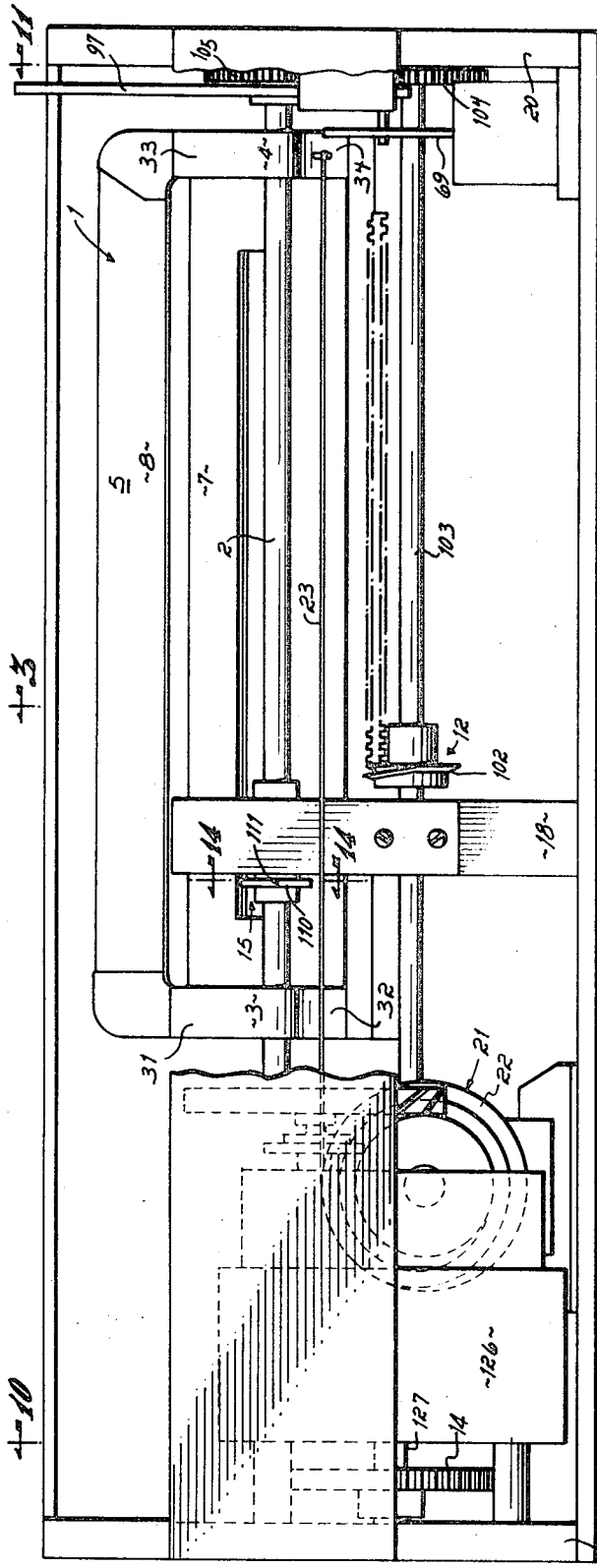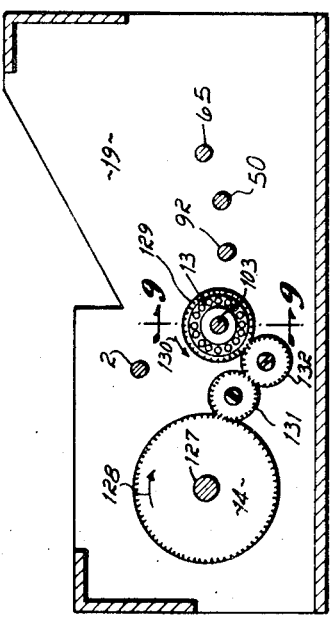

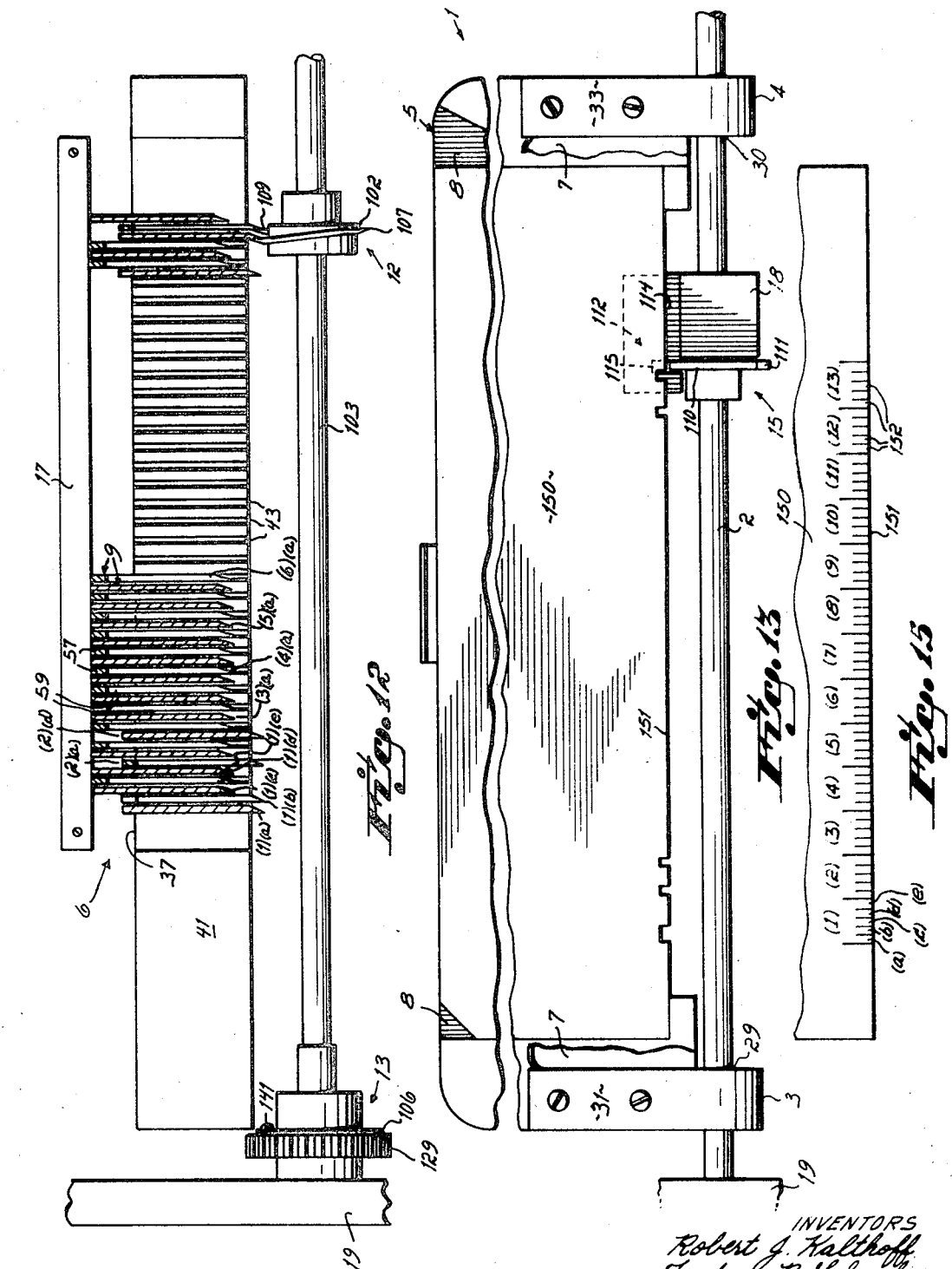

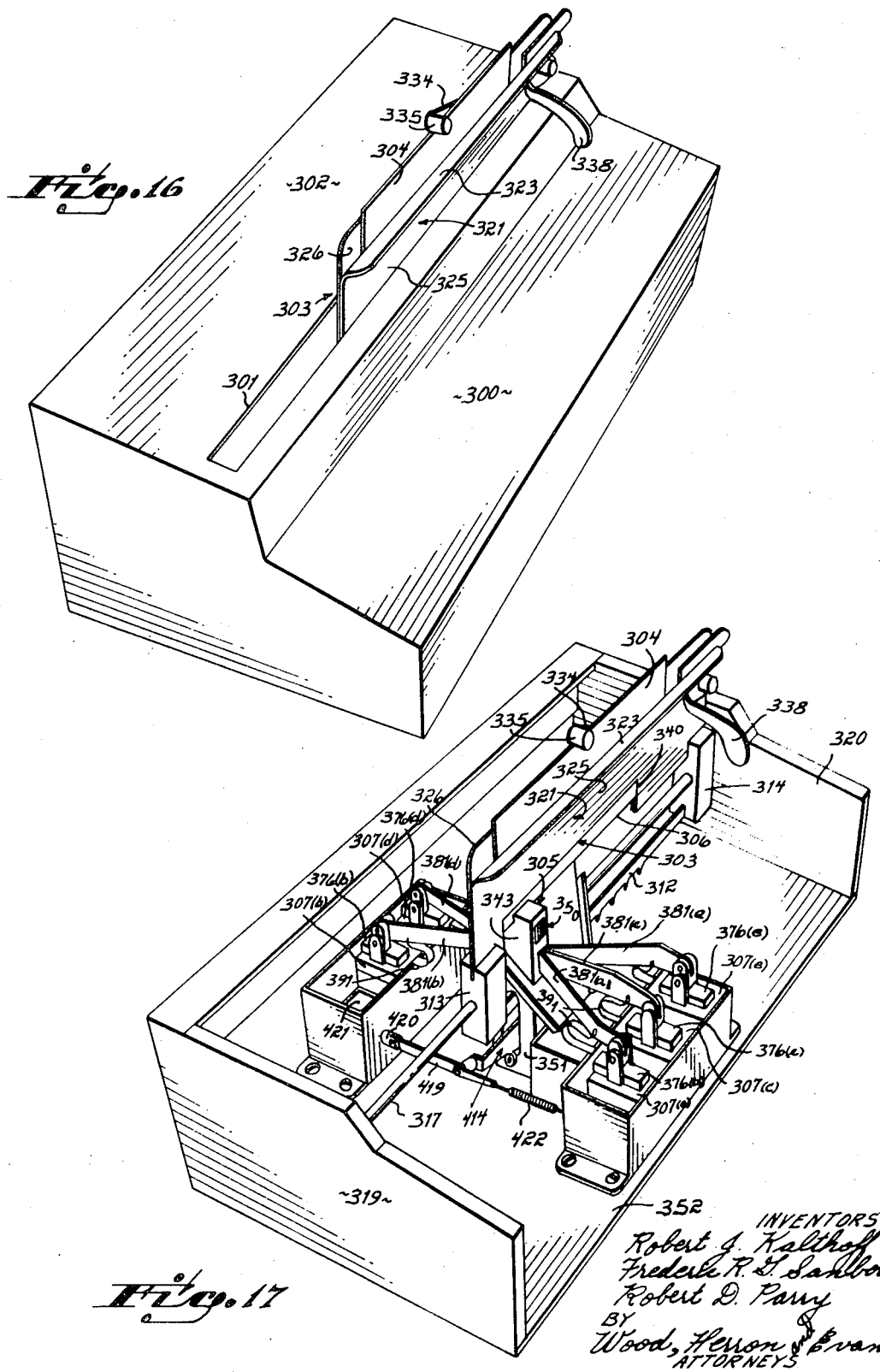

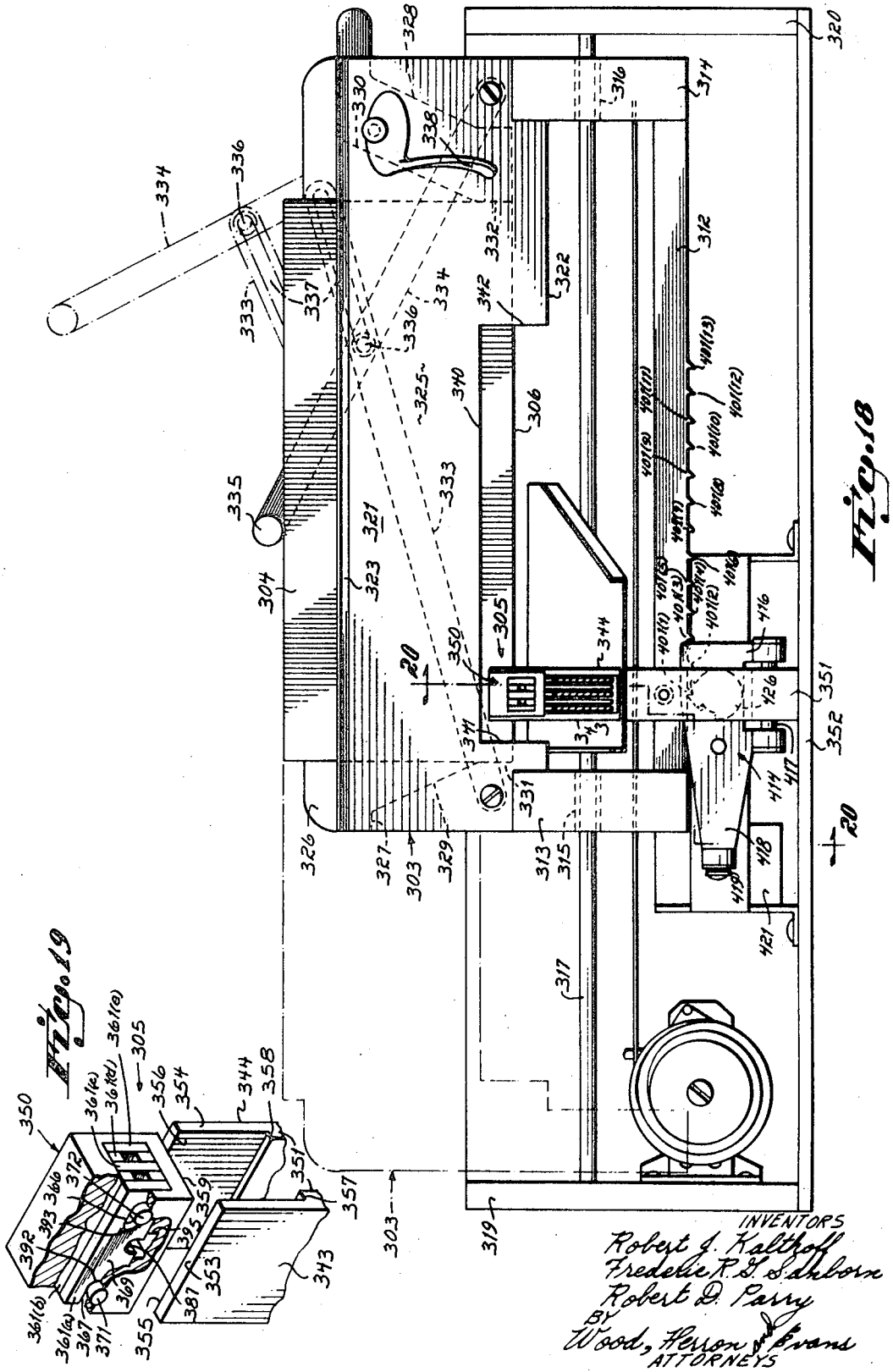

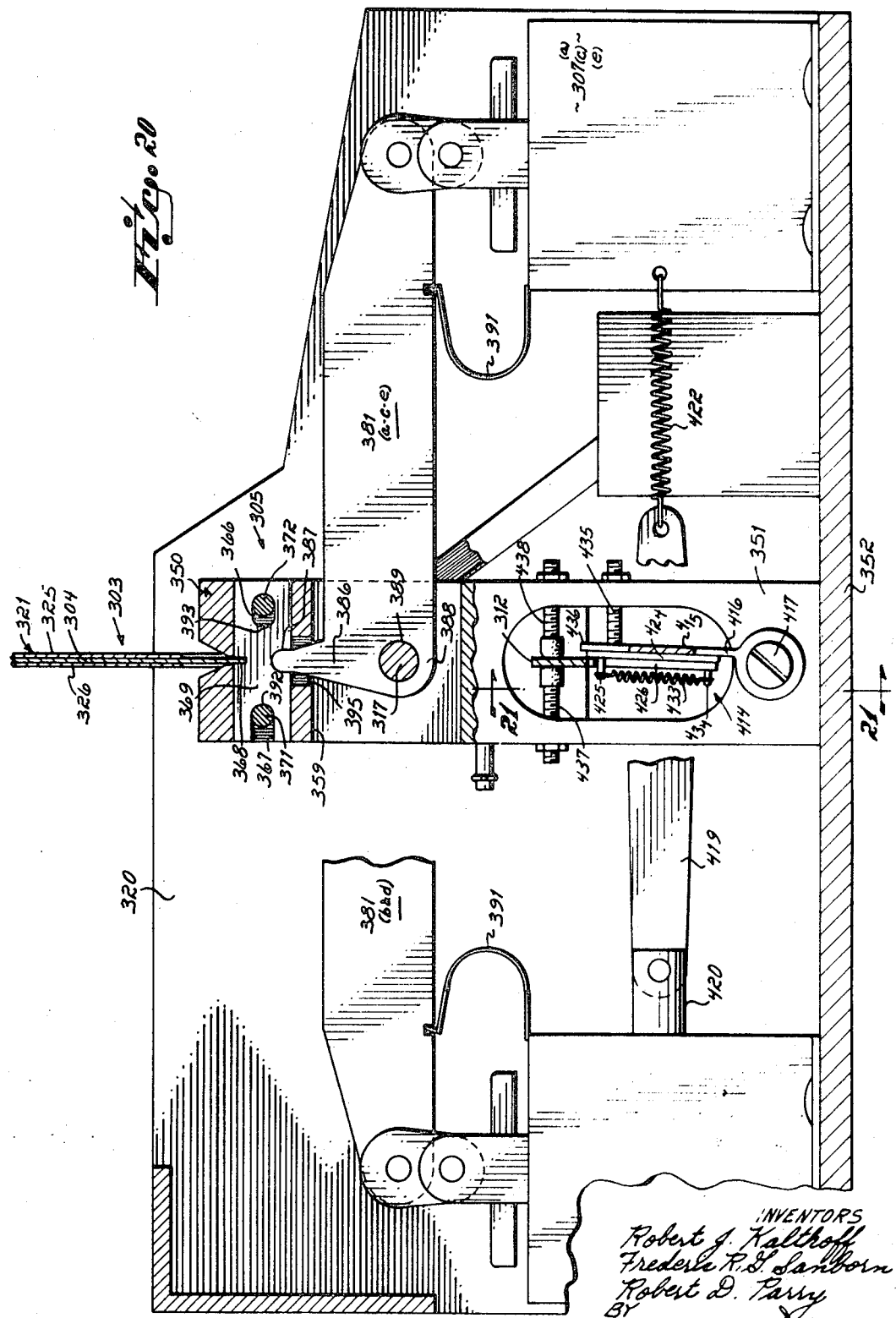

Sept. 30, 1969 R. J. KALTHOFF ET AL 3,469,774
CODER FOR EDGE NOTCHED CARDS AND THE LIKE
Filed April 4, 1966 17 Sheets-Sheet 12

INVENTORS
Robert J. Kalthoff
Frederic R. D. Sanborn
Robert D. Parry
BY
Wood, Herron & Evans
ATTORNEYS

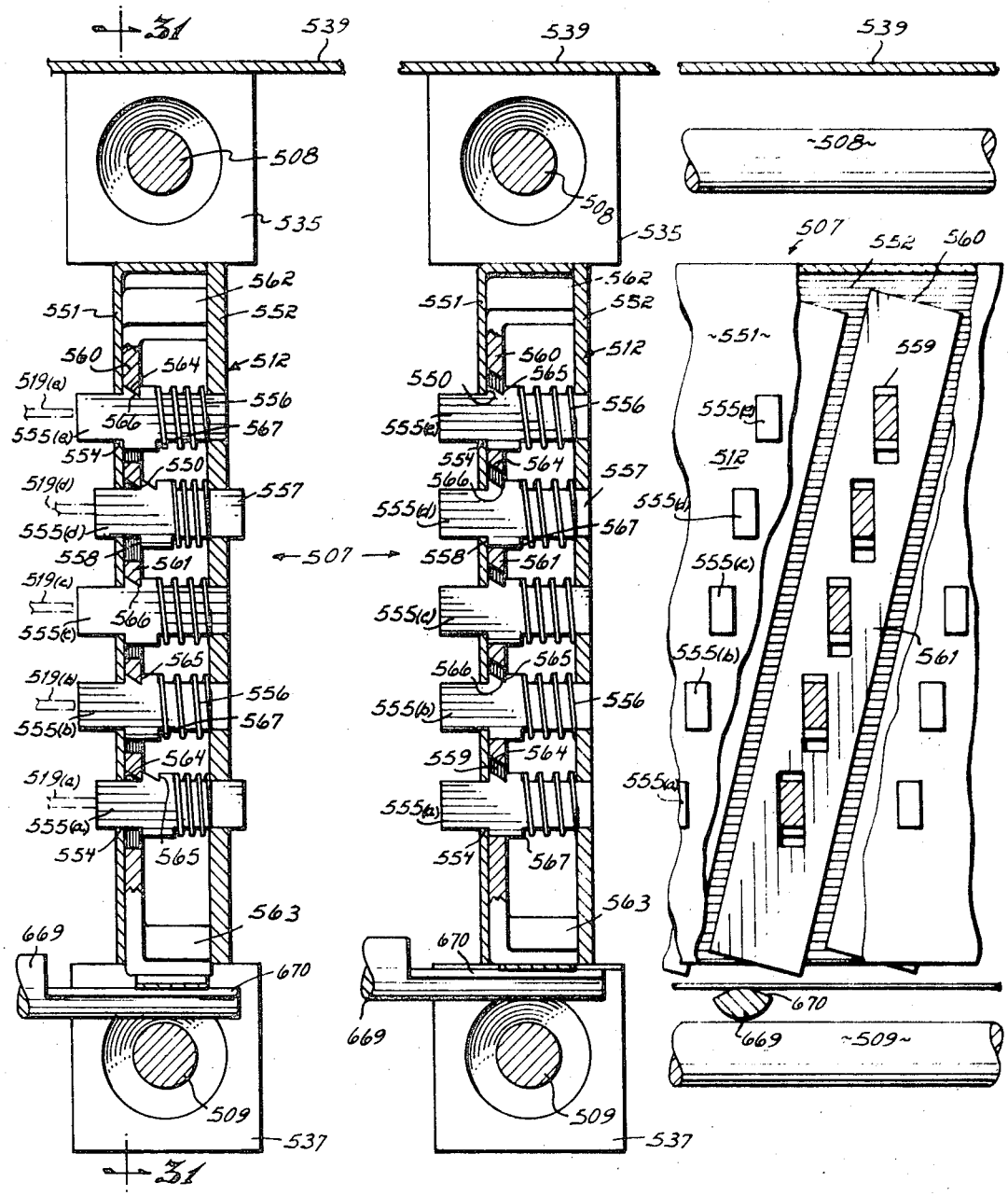

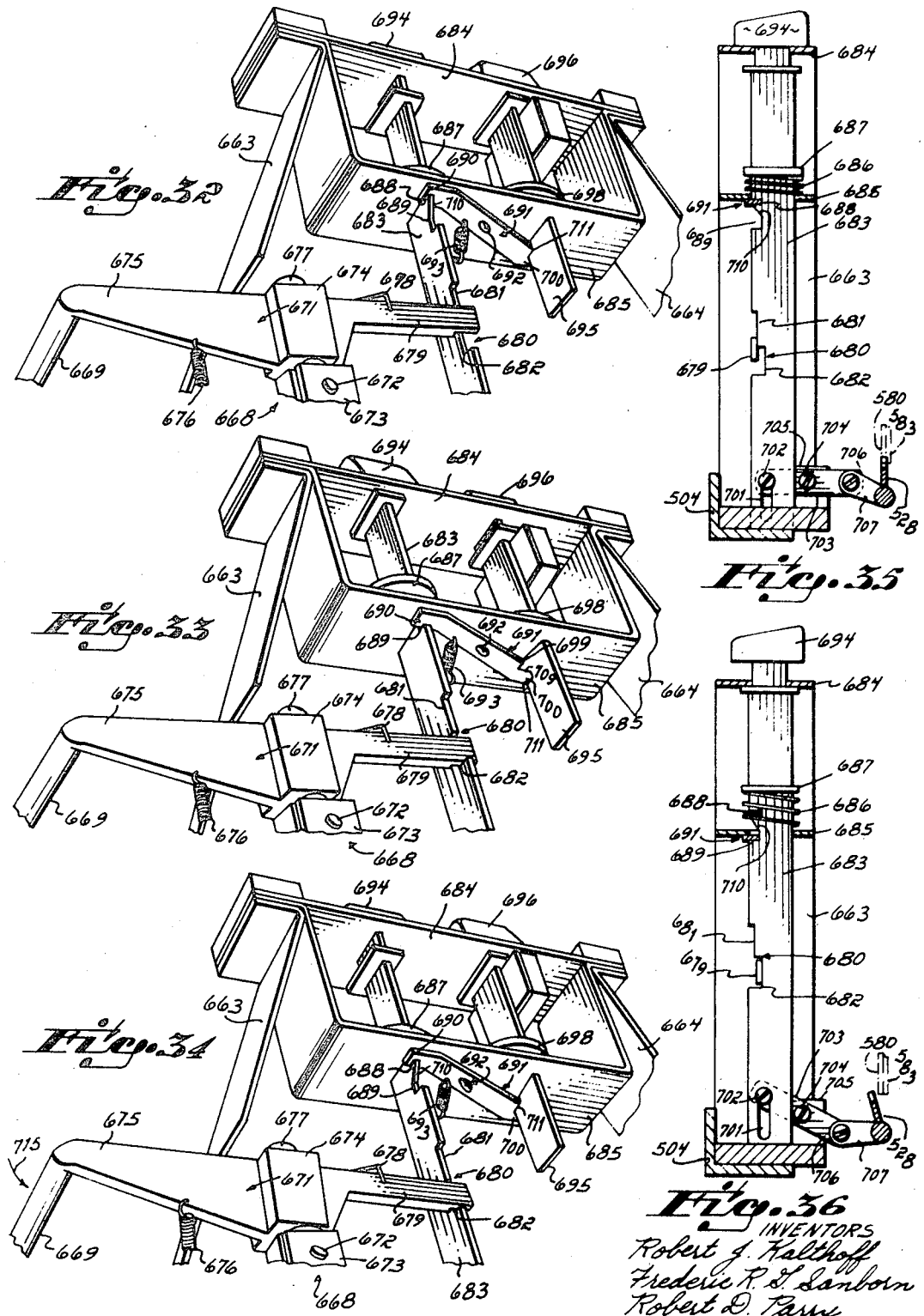

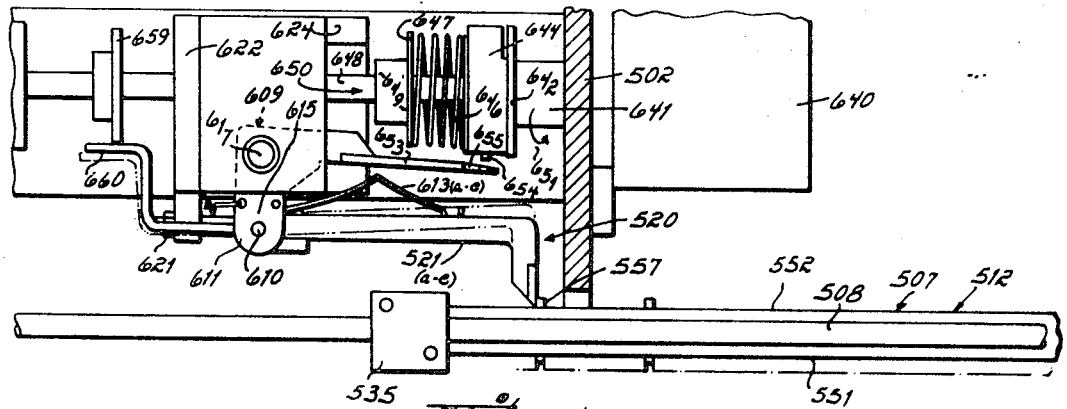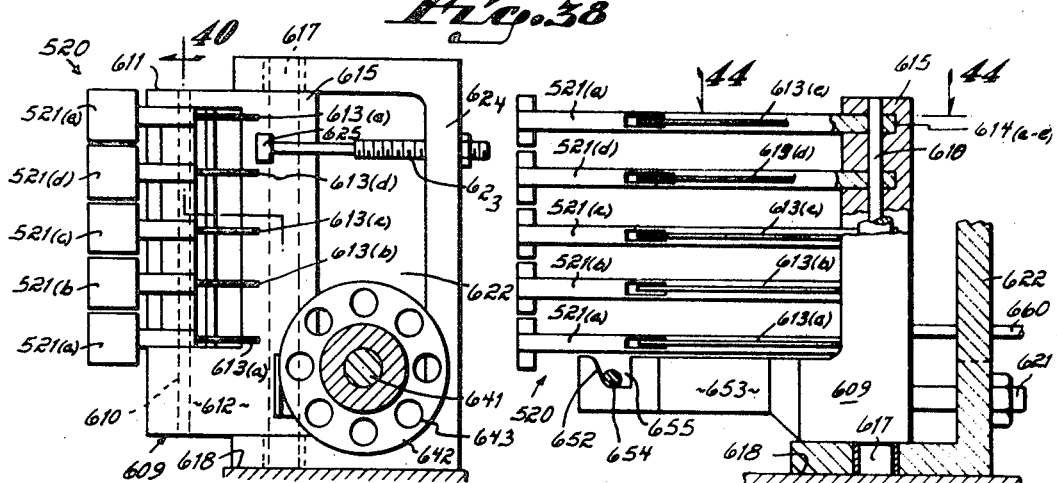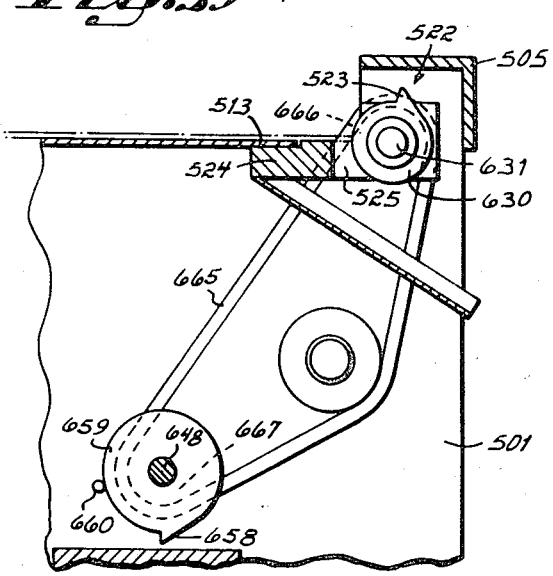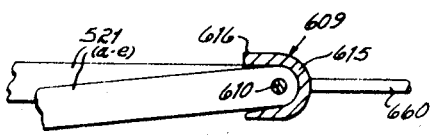

United States Patent Office 3,469,774
Patented Sept. 30, 1969

3,469,774
CODER FOR EDGE NOTCHED CARDS AND THE LIKE
Robert J. Kalthoff, Frederic R. G. Sanborn, and Robert D. Parry, Cincinnati, Ohio, assignors to O. K. Partnership, Cincinnati, Ohio, a limited partnership of Ohio
Filed Apr. 4, 1966, Ser. No. 539,708
Int. Cl. G06k 1/00
U.S. Cl. 234—1
63 Claims

ABSTRACT OF THE DISCLOSURE

Apparatus and method for selectively notching fields of notch sites located along the edge of a record including a record holder, a site-notching punch positioned to notch sites along the edge of a record held by the record holder, and an indexer interconnecting the record holder and the site-notching punch which relatively moves the record edge past the site-notching punch to enable the notch sites of the record edge to be selectively notched in response to code inputs sequentially fed to the punch as the indexer relatively moves the punch and record. Also disclosed is a memory unit having storage elements corresponding in number to the number of notch sites along the record edge, a storage element code entry unit for entering code inputs into the storage elements, the memory and entry units being relatively movable, and a storage element sensing and punch actuating unit which senses the stored code inputs entered into the memory unit and in response thereto actuates the punch to selectively notch the sites along the card edge as the indexer moves the punch and record relatively.

---

This invention relates in general to data retrieval system and is particularly directed to methods and apparatus for coding record cards by selectively notching one or more edges of the card in accordance with a predetermined code.

In the recent past there has been an increasing awareness of the need for small mechanized data retrieval systems effective to select either a desired document or a desired class of documents from a collection of randomly stored documents. One such system is disclosed in the copending patent application of Robert J. Kalthoff et al. for "Data Retrieval Apparatus and Method," Ser. No. 539,716, filed April. 4, 1966, now Patent No. 3,450,261, the entire disclosure of which is incorporated herein by reference.

In a system of the type shown in this latter application, the documents are most commonly in the form of rectangular cards, although the system also contemplates the use of microfiches, film jackets and the like. Each of these documents, of which cards are exemplary, are coded along one edge by selectively notching the edge at various notch sites. The card itself may, for example, contain a reference to a book or periodical, it may hold a microfilm or image of a drawing, a microxerographic copy of a document, or it may contain any form of record information; for example, the personnel data regarding an employee, data concerning a house for sale or the like.

Each of the record cards stored in the system can be coded with a large number of descriptors. For example, an employee record card may be coded with a several digit employee number, the employee's sex, education, job experience, present job description, employee's skills, employee's salary grade, union membership, location and the like. A collection of these cards is randomly placed in a selector device with their notched sorting edges parallel to one another. The operator then enters the code corresponding to the desired card or cards on a keyboard or console; for example, a console of the type shown in the copending application of Robert J. Kalthoff et al. for "Console and Control Circuit," Ser. No. 539,792, filed Apr. 4, 1966, the entire disclosure of which is incorporated herein by reference. The cards, each of which includes a metal implant, are brought against a magnet and a series of selector bars are advanced in correspondence with the code pattern of the desired cards entered in the console. These selector bars then push, or reject all cards not having coded notches conforming to the selector bar pattern from the magnetic field. The desired cards, i.e., those which have the selected code pattern, are not shifted but remain in contact with the magnet since the selector bars enter the notches coded in these cards. Subsequently, these selected cards are withdrawn from the machine.

This system of mechanically selecting cards makes it possible to search for documents in several different modes. For example, one search technique makes it possible to locate a single document for a series of randomly stored documents, e.g., a card relating to an employee having a certain employee identification number. The system also makes possible multiple access to the cards; for example, all of the cards belonging to a certain class, i.e., fitting one descriptor, can be retrieved. For example, from the employee records all of the cards relating to female employees could be retrieved, or all of the cards showing employees with a specific skill; for example, typing, Class A welders or the like, could be retrieved.

Additionally, this system permits a search in a multiple cross access mode in which only those cards are selected which simultaneously conform to each of a number of descriptors. Again, in the personnel setup by way of example, a selection can be made of only those cards relating to employees who are female, and are over twenty-five years of age, and who have at least two years of college, and who have typing skill, and who are employed in a certain location.

A system of the type described utilizes cards which can be coded with any or all of a large number of descriptors. For example, one preferred form of card for use with this system can be coded with any of ten million million code possibilities. This coding capability is accomplished by providing sixty-five contiguous notch sites along an edge of the card referred to as the "sorting edge." In this coding method, the sixty-five notch sites are grouped into thirteen character fields, each field containing five notch sites.

Each field can be coded either using an alpha-numeric code or a bit code. In the alpha-numeric code, two of the five notch sites in the field are notched to a uniform depth. This provides ten different code possibilities representing either digits or letters in each field. Alternatively, the field can be coded in a bit fashion in which any combination of from one to five bits are coded in the field by notching any combination of from one to five of the notch sites.

The reliable operation of a data retrieval system of this type is dependent, for a large part, upon the availability of accurately notched cards. It will readily be appreciated that a machine having sixty-five selector bars operating along the edge of a card seven inches long requires relatively small tolerances both in the machine and cards. Thus, the cards for use in such a system must be provided with notches which are accurately positioned along the sorting edge of the card. Moreover, the notch dimensions themselves must be accurately maintained. For if a notch is improperly located or incorrectly sized, it may cause a card to be improperly selected by failure of a selector bar to engage the card or improperly ejected due to a bar missing a notch.

Thus, one of the principal objects of the present invention is to provide edge notched coding apparatus effective to form accurately positioned notches of uniform, precisely controlled, width and depth at predetermined locations along a sorting edge of a card.

It is another important object of the present invention to provide a coder which can be readily operated by relatively unskilled clerical personnel or an end user, such as a lawyer, physician or the like. More particularly, the present invention contemplates a coder which can be operated from a keyboard having keys marked directly with an alpha-numeric bit or other rods. Thus, the user merely operates the keyboard to enter the desired code and the coder automatically notches the card in the proper field and notches the proper combination of bits within each field. The user need know nothing whatsoever of the intricacies of the coding system, e.g. what combination of notches corresponds to a specific letter or number.

It is another specific object of the present invention to provide a coder which can be operated directly from the same console used to operate the data retrieval apparatus, the advantage here being that the operator need only acquaint himself with the operation of a single console in contradistinction to becoming familiar with separate consoles for the coder and selector.

It is readily apparent that the needs of the users of the present coders vary considerably. Thus, one user who has a smal system and who codes only a small number of cards for use in this system has need for a compact, reliable, low cost coder. On the other hand, there are many users who may operate or provide cards for a number of systems. These users find it highly desirable to produce a plurality of edge notched cards each having the same coding. Therefore, one important aspect of the present invention resides in the provision of a coder for producing any number of duplicate edge notched cards with but a single entry of the characters into the keyboard unit.

It has been a further object of this invention to provide apparatus for notching fields of notch sites located along the sorting edge of a card in accordance with a predetermined code substantially coincident with the actuation of character keys of an associated keyboard.

It has been a still further object of this invention to provide a simple reliable mechanical memory unit for storing character code signals which is useful in conjunction with apparatus for producing duplicate cards notched along a sorting edge in accordance with a predetermined code.

To accomplish these and other objectives of the invention, the various embodiments thereof include at least one selectively actuable site notching punch, a card holder which positions the sorting edge of a card in notching disposition relative to the punch, and an indexer which interconnects the punch and card holder. The indexer functions to produce relative shifting and indexing motion between the card holder and the punch, thereby enabling the fields of notch sites to be successively notched by the site notching punch in accordance with a predetermined code and in response to character code signals generated by the actuation of character keys of a keyboard.

Those coders which are adapted to produce duplicate cards are further provided with a memory unit movable with the card holder. The memory unit includes a plurality of fields of memory fingers corresponding in number to the fields of notch sites and selectively movable between set and reset positions. These coders also include setters which function to set, on a field-by-field basis, the fingers corresponding to the sites to be notched as the memory and card holder move in field-by-field fashion relative to the setters and punch. The setters are selectively operable in response to the sequential actuation of the keyboard coder character keys. In addition, a sensing unit is provided which successively senses those fingers which have been set, and in response thereto actuates the punch to notch the sites which correspond to the set fingers.

Thus, the embodiments having the memory unit store the character code signals generated by the keyboard coder unit and use the stored signals to actuate the punch as the card holder and memory unit move relative to the punch. Providing the memory unit is not erased, duplicate cards can be notched by returning the memory unit and card holder to their initial positions, inserting an unnotched card into the card holder, and thereafter moving the card holder and memory unit relative to the punch to effect sensing of the set memory fingers and actuation of the punch in response thereto. Hence, duplicate edge notched cards are produced without having to reactuate the character keys of the keyboard coder unit.

Other objectives and advantages of the invention will be readily apparent to those skilled in the art from the following detailed description of the drawings in which:

SIMULTANEOUS KEYING AND NOTCHING DUPLICATING CODER

FIGURE 1 is a perspective view, partially broken away, of a preferred embodmient of a record card edge notching apparatus constructed in accordance with some of the principles of this invention;

FIGURE 2 is a fragmentary perspective view of a memory unit for the card notching apparatus of FIGURE 1;

FIGURE 3 is an enlarged cross-sectional view, taken along line 3—3 of FIGURE 8, illustrating the memory unit and its associated memory finger actuating mechanism, the carriage assembly, the finger sensing unit, and the notching device;

FIGURE 4 is an elevational view, partially in cross section, taken along line 4—4 of FIGURE 3, illustrating the carriage stepping mechanism;

FIGURE 7 is an elevational view of the carriage stepping mechanism in an intermediate stepping position;

FIGURE 8 is a front elevational view, partially broken away, of the card notching apparatus of this embodiment;

FIGURE 9 is a cross-sectional view of the clutch taken along line 9—9 of FIGURE 10;

FIGURE 10 is a cross-sectional view taken along line 10—10 of FIGURE 8, illustrating a portion of the drive assembly;

FIGURE 11 is a cross-sectional view taken along line 11—11 of FIGURE 8 depicting the remainder of the drive assembly;

FIGURE 12 is a cross-sectional view, taken along line 12—12 of FIGURE 3 illustrating the relationship of the memory unit and its associated sensing unit;

FIGURE 13 is an elevational view, partially broken away, of the card holding mechanism and the notching punch, showing the relationship of the card holding mechanism and the notching punch to the memory unit and sensing unit depicted in FIGURE 12;

FIGURE 14 is a cross-sectional view illustrating the relationship of the notching punch and its associated die preparatory to the notching of a notch site; and FIGURE 15 is an elevational view of the sorting edge of a card diagrammatically divided into thirteen character fields having five notch sites per field.

NON-DUPLICATING CODER

Figure 21:
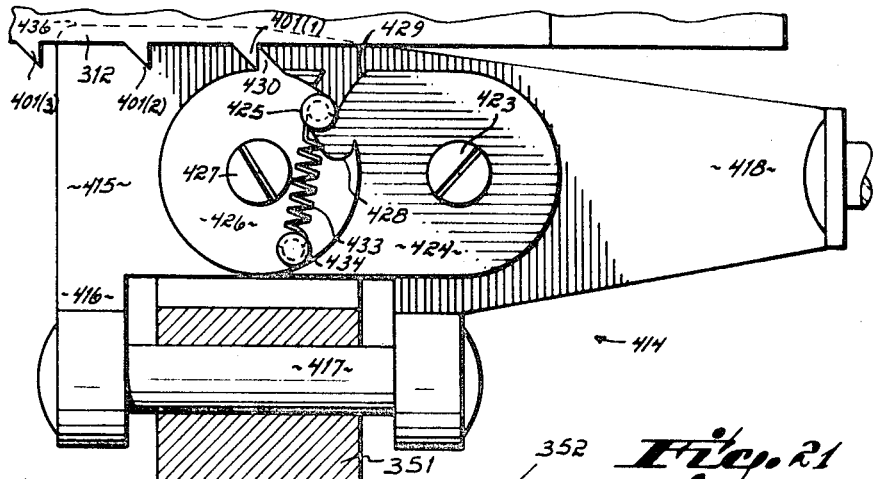
Figure 22:
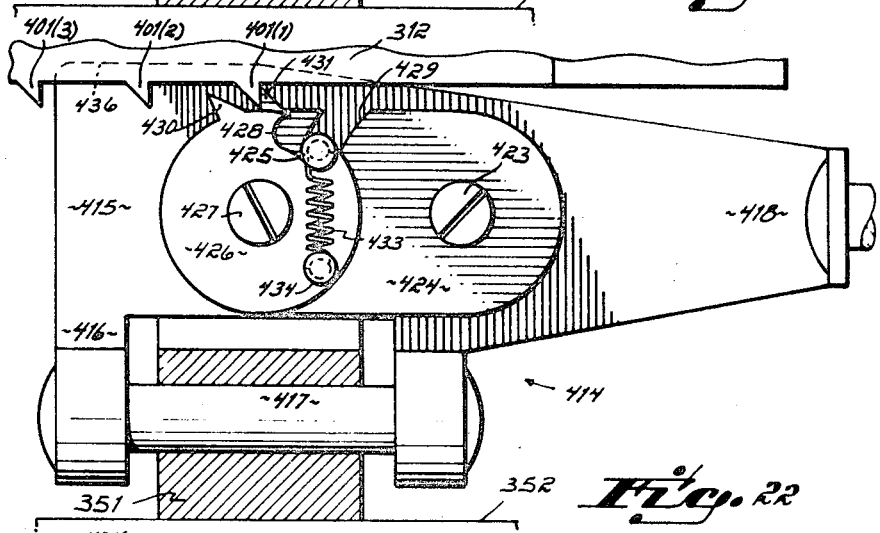
Figure 23:
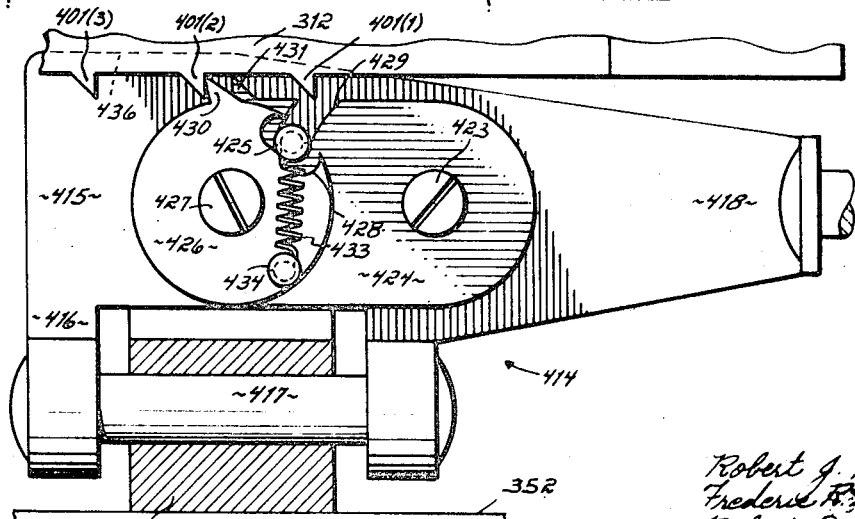

FIGURE 16 is a perspective view of another preferred embodiment of a record card notching apparatus constructed in accordance with some of the principles of this invention;

FIGURE 17 is a perspective view of the card notching apparatus of FIGURE 16, with the cover removed to show its operating components;

FIGURE 18 is a front elevational view, partially in cross-section, illustrating the card notching apparatus of this embodiment;

FIGURE 19 is a perspective view, partially broken away and exploded, depicting the card notching station;

FIGURE 20 is a cross-sectional view taken along line 20—20 of FIGURE 18, illustrating the mechanism for reciprocating the punches located at the punching station;

FIGURE 21 is an elevational view taken along line 21—21 of FIGURE 20 illustrating the carriage stepping mechanism in its normal position; and FIGURES 22 and 23 are elevational views taken along line 21—21 of FIGURE 20, showing the carriage stepping mechanism at various stages in the process of stepping the carriage to the next successive field.

SEQUENTIAL KEYING AND NOTCHING DUPLICATING CODER

Figure 24:
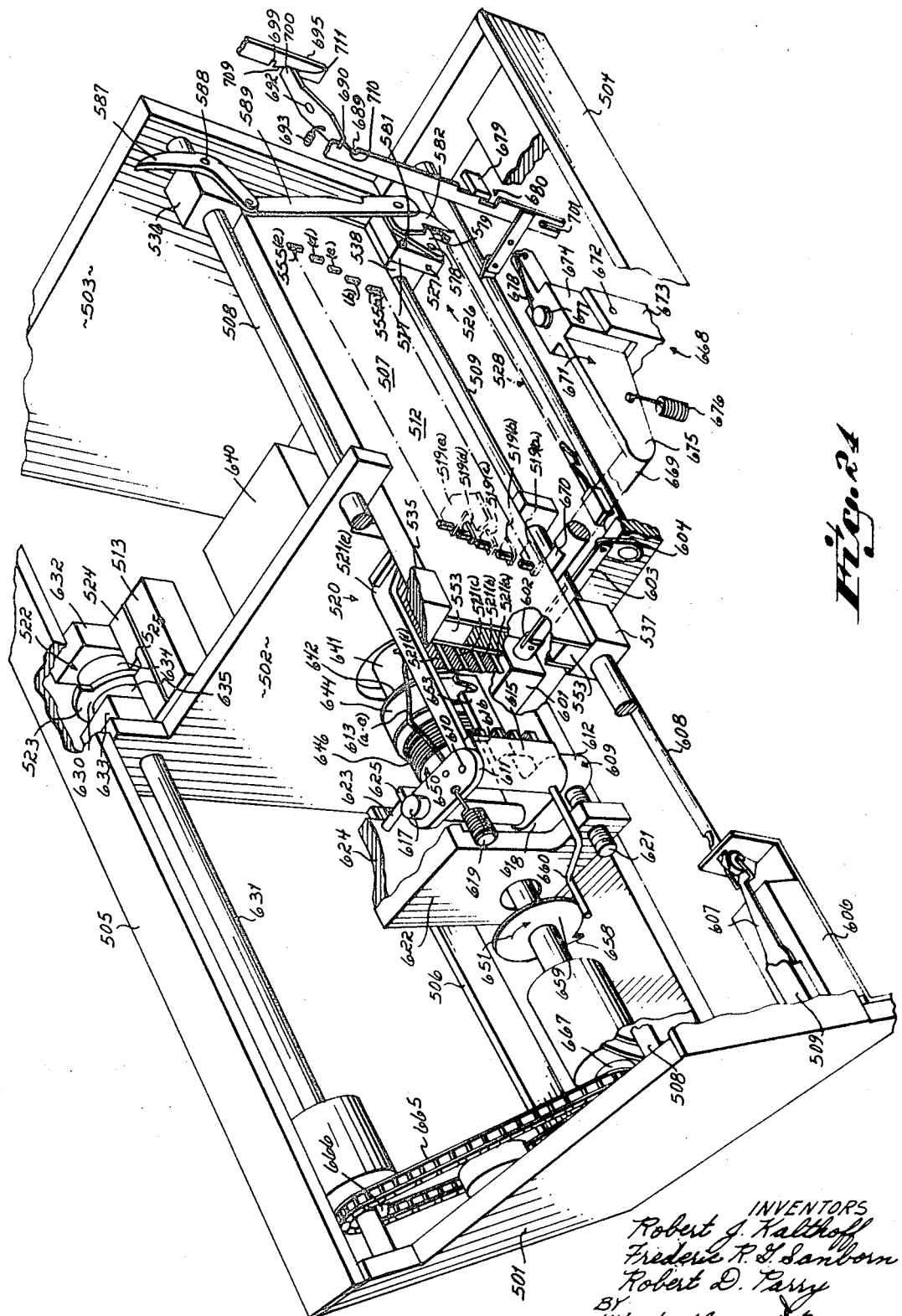
Figure 25:
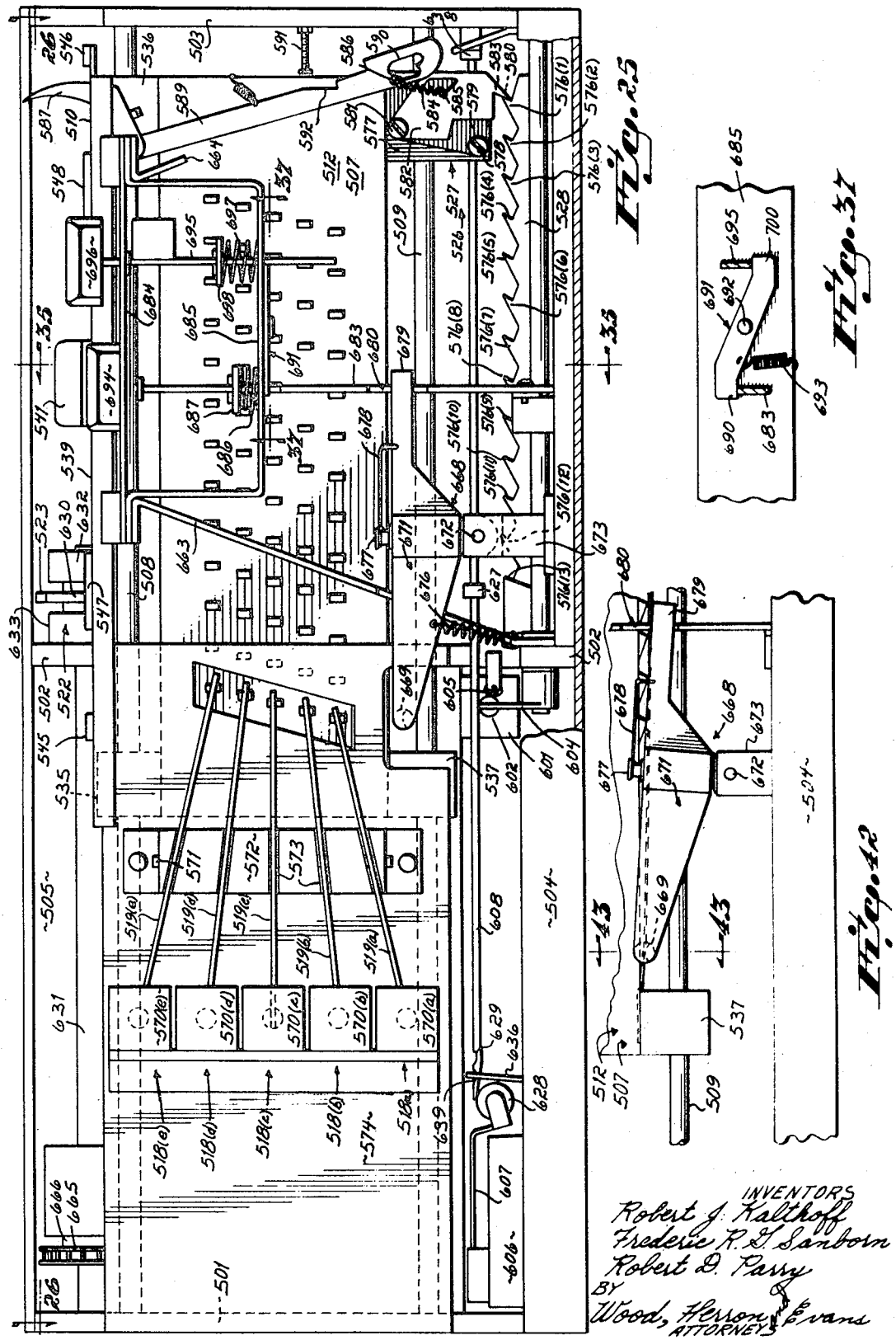
Figure 26:
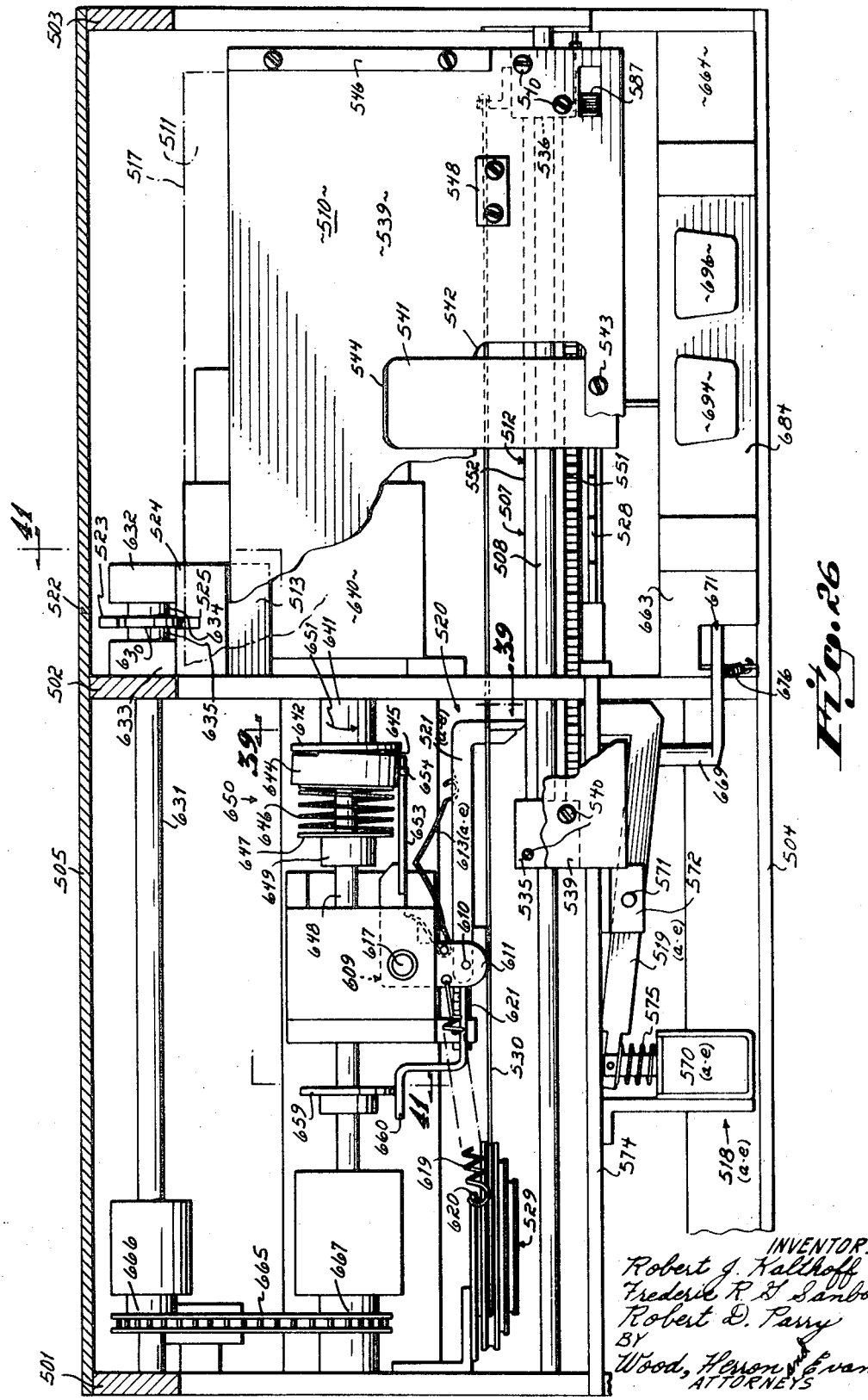
Figure 27:
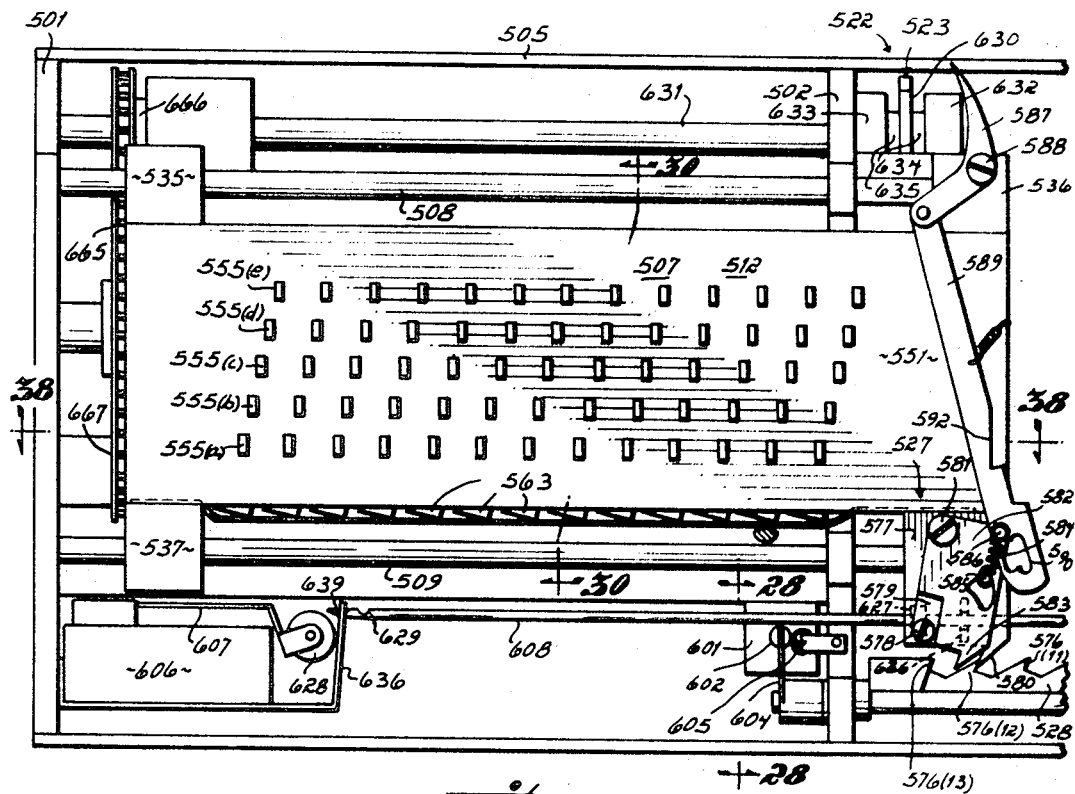
Figure 28:
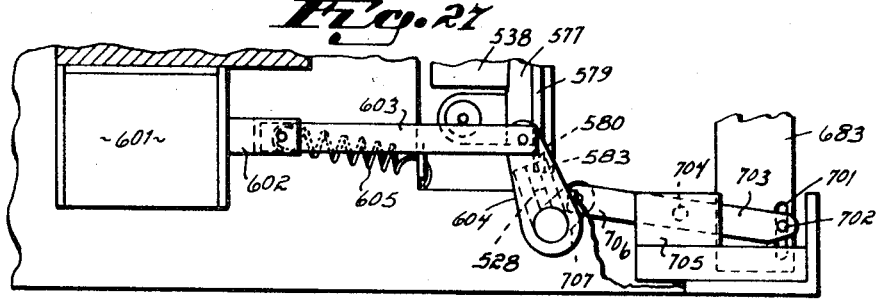
Figure 29:
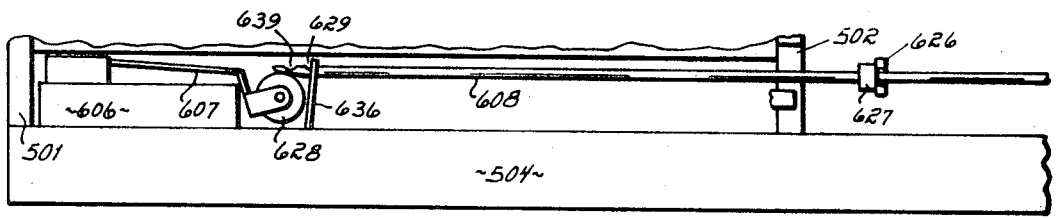

FIGURE 24 is a perspective view, with the cover removed to show its operating mechanisms, or still another embodiment of a card notching apparatus constructed in accordane with some of the principles of this invention;

FIGURE 25 is a front elevational view, partially broken away, of the card notching apparatus shown in FIGURE 24;

FIGURE 26 is a top plan view, partially in cross-section, taken along line 26—26 of FIGURE 25;

FIGURE 27 is a front elevational view of the memory unit just prior to being stepped into the last field position;

FIGURE 28 is a cross-sectional view of the carriage stepping solenoid, taken along line 28—28 of FIGURE 27;

FIGURE 29 is an elevational view of the drive motor control switch illustrating the switch in the off position;

FIGURE 30 is a cross-sectional view, taken along line 30—30 of FIGURE 27, illustrating a locking strip in the engaged position with some of the associated fingers set;

FIGURE 31 is a cross-sectional view, partially in elevation, taken along line 31—31 of FIGURE 30;

FIGURE 32-34 are fragmentary perspective views of the memory erasing and card notching control buttons and their associated mechanisms, shown in their several functional operating positions;

FIGURE 35 is a cross-sectional view of the erasing control button and its associated mechanisms shown in a memory finger setting position;

FIGURE 36 is a cross-sectional view of the erasing control button and its associated mechanism, shown in a card notching position;

FIGURE 37 is a view, partially in cross-section, taken along line 37—37 of FIGURE 25, showing a detent lever operable by the erasing control button and the notching control button;

FIGURE 38 is a cross-sectional view taken along line 38—38 of FIGURE 27, illustrating the finger sensing unit and the clutch operated thereby;

FIGURE 39 is a cross-sectional view taken along line 39—39 of FIGURE 26, further illustrating the clutch and the finger sensing unit;

FIGURE 40 is a cross-sectional view taken along line 40—40 of FIGURE 39, showing the details of the finger sensing unit;

FIGURE 41 is a cross-sectional view taken along line 41—41 of FIGURE 26, illustrating the drive assembly including the drive chain, the main drive shaft, and the card notching drive shaft;

FIGURE 42 is a front elevational view of the set finger erasing or resetting mechanism shown in the memory erasing position;

FIGURE 43 is a cros-ectional view of the memory unit, taken along line 43—43 of FIGURE 42, showing the locking strip and erasing mechanism in the finger resetting position; and FIGURE 44 is a cross-sectional view taken along line 44—44 of FIGURE 40, showing the manner in which the finger sensing arms are pivotally mounted at their inner ends.

INTRODUCTION

The application to which this invention finds particular, but not exclusive, utility involves the edge notching of records or cards 150 of the general type shown in FIGURES 13 and 15. Basically, the card 150 is rectangularly configurated and fabricated of paper stock, plastic or similar material suitable for notching. The lower edge 151 of the card 150, which functions as a sorting edge, provides a plurality of notch sites 152 upon which is coded information related to the data stored on the card. While a variety of coding schemes might be employed to notch the card 150, one particular scheme has been found to be preferred. This preferred coding method, which is explained in more detail is copending application by Kalthoff et al. for "Data Retrieval Apparatus and Method," Ser. No. 539,716, filed Apr. 4, 1966, contemplates dividing a portion of the sorting edge 151 into thirteen code fields 1–13, each having five notch sites $a$–$e$. The five notch sites $a$–$e$ available at each code field 1–13, which collectively represent a single character, are then notched using a "two-out-of-five" code.

The "two-out-of-five" code yields ten different possible code combinations or characters per field, thereby affording ten million million different possible identifiers for a thirteen field card. Other codes, in addition to this, may be employed depending on the particular needs of the user. For example, a "one-out-of-five" code might be utilized wherein one site is notched per field, yielding five different possible code combinations or characters per field, which in turn permits $5^{13}$ cards to be coded each having a different notched configuration. Variations in the number of notch sites or bits per character field as well as in the number of characters or fields are also possible. For example, ten six-bit character fields might be utilized.

For the purpose of clarity, in the following description of the preferred embodiments of the invention, the term "site notching cycle" refers to the notching of a single notch site, while the term "card notching operation" refers to the notching of the various sites $a$–$e$ of the different fields 1–13 in accordance with some predetermined code. The term "notching" refers to either or both of the above terms. In addition, the term "character keying cycle" refers to the generation, in response to the actuation of a single character input key of a keyboard coder, of a single "two-out-of-five" character code signal for operating the notching apparatus of this invention to produce the desired coded notches corresponding to said character for a single one of the fields 1–13. Whereas, the term "character keying operation" refers to the generation, in the manner and for the purpose described above, of the "two-out-of-five" code signals for all of the characters of the various fields 1–13 of a single record. The term "keying" refers to either or both of the immediately preceding two terms.

SIMULTANEOUS KEYING AND NOTCHING DUPLICATING CODER

General description

The first embodiment of the invention, which notches as it codes, and which produces duplicate notched records or cards with only a single coding operation, is shown in FIGURES 1–15. A shown more particularly in FIGURE 1, the first embodiment of this invention includes a carriage assembly 1. The carriage assembly 1 comprises spaced carriage side structures 3 and 4 mounted for both transverse sliding and limited pivotal motion on a horizontally extending guide rod 2 which is supported at its mid-portion by a central frame member 18 and at its ends by side frame members 19 and 20. Mounted to the side frame structures 3 and 4 for movement therewith is a card holder 5 and a memory unit 6. The card holder 5 includes spaced parallel front and rear panels 7 and 8 between which is inserted a card to be notched with its sorting edge 151 lowermost.

The memory unit 6 comprises a plurality of L-shaped fingers 9 corresponding in number to the number of notch sites on the sorting edge 151 of a card 150 and spaced in a transverse row at intervals equal to the spacing of the notch sites to which the respective fingers correspond. The fingers 9, which are arranged in fields corresponding to the fields 1–13 of the card 150, are selectively shiftable within the memory unit 6 on a field-by-field basis from raised, non-notching or reset positions to lowered, notching or set positions, by a set of five finger setting solenoid actuators 10. The setting of the fingers 9 of any single given field corresponds to a single keying cycle. A finger sensing unit 112 is positioned in the path of the lower extremities of set fingers 9 and functions to engage a clutch 13 for a single revolution each time a longitudinally shifted or set finger moves past the sensing unit, thereby driving a notch device 15 through a site notching cycle. A carriage stepping mechanism 11, in combination with a carriage biasing spring device 21 (FIGURE 8), steps the carriage assembly 1 on a field-by-field basis past the notching device 15 and finger sensing unit 12 during the keying and notching operation.

In operation, a card is positioned between the front and rear panels 7 and 8 of the card holder 5 and the carriage assembly 1 returned to the rightmost or return position by transversely shifting the carriage assembly 1 along the guide rod 2. The characters to be entered into the various data fields 1–13 are then sequentially keyed into a suitable keyboard unit (not shown), causing the sequential generation of code signals and causing the carriage stepping mechanism 11 to advance the carriage assembly 1 leftwardly on a field-by-field basis. As the carriage assembly 1 advances, causing the fields of fingers 9 to sequentially become aligned with the set of finger setting solenoid actuators 10, the memory fingers are longitudinally shifted or set on a field-by-field basis in accordance with the characters sequentially entered into the keyboard unit and the character code signals generated thereby. Thus, each time a character for a field is keyed in, the appropriate fingers in the corresponding field are set, thereby storing the code signals corresponding to the keyed character, that is, the character code signals. In addition, as the carriage advances, the fingers which have been longitudinally shifted or set sequentially abut the sensing unit 12. This sequential abutting causes the clutch 13 to become engaged every time a notch site to be notched is registered at the notching device 15. Engagement of the clutch 13 drives the notching device 15 through a notching cycle producing a notch at the registered notch site. Thus, the character keying causes the concurrent generating, storing and sensing of the character code signals in the memory 6, and the notching of the card in accordance with the character which has been coded, stored and sensed.

If duplication of a particular card which has been notched is desired, the carriage assembly 1 is pivoted upwardly, raising the bank, array or row of fingers, including those longitudinally shifted or set, away from the sensing unit 12, thereby permitting the carriage to be transversely shifted along the guide rod 2 to the rightmost or return position without the sensing unit 12 abutting any of the set or longitudinally shifted fingers 9. When the carriage assembly 1 has been returned, the carriage assembly is then released and allowed to advance to the left under the action of the spring biasing means 21. As the carriage assembly 1 advances, the longitudinally shifted or set fingers 9 again sequentially abut the sensing unit 12 causing the notching device 15 to be periodically driven through a notching cycle, notching the appropriate notch sites in the card in the manner described previously. Thus, duplicate cards are produced with a single character keying operation.

Figure 5:
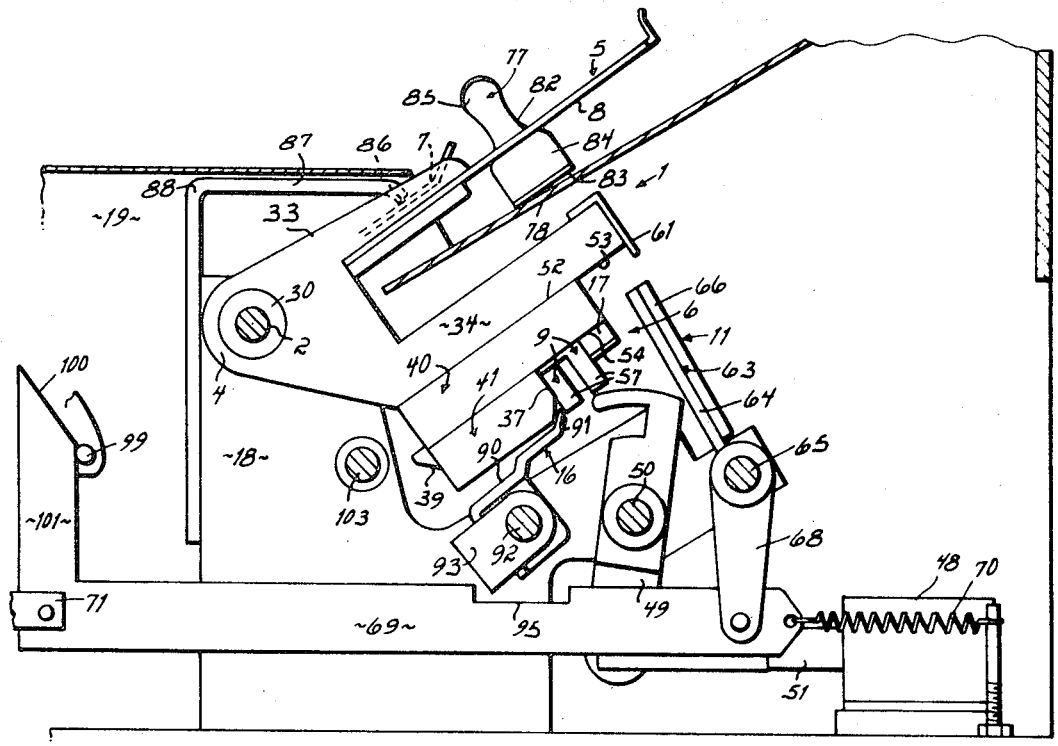
FIGURE 5 is a side elevational view of the carriage assembly in the raised position preparatory to erasure of the memory unit.

Referring now to FIGURE 5, the memory unit 6 is erased, with the aid of an erasing mechanism 16. Specifically, erasing is achieved by pivoting the carriage assembly 1 upwardly and allowing the upper edge 91 of an erasing blade 90, constituting a part of the erasing mechanism 16, to move underneath the shorter legs of the L-shaped fingers 9. When the carriage assembly 1 is thereafter pivoted downwardly about the guide rod 2, the upper edge 91 of the erasing blade 90 abuts the shorter legs of the fingers 9, thereby longitudinally shifting the fingers 91 upwardly. Once shifted upwardly, a bar magnet 17, which extends transversely above the shorter legs of the memory fingers 9, maintains the fingers 9 in the raised position until set by a subsequent keying-notching operation.

Detailed description

The carriage assembly 1 includes a pair of spaced carriage frame members 3 and 4 having upwardly extending front and rear legs 31, 32 and 33, 34, respectively. The carriage frame members 3 and 4 are provided with journal bearings 29 and 30, respectively, in their lower extremities through which passes the guide rod 2. The journal bearings 29 and 30 permit the carriage frame members to slide transversely thereon as well as pivotally thereabout. Spanning the carriage frame members 3 and 4 and secured to the back surface of the vertical legs 31 and 33 is the back panel 8 of the card holder 5. Parallel to and spaced slightly apart from the back panel 8 is the front panel 7. The front panel 7 spans the carriage frame members 3 and 4 between the inside surfaces thereof. The bottom edge of the front panel 7 is secured to the back panel 8 in any suitable manner while the upper edge is spaced therefrom and slightly flared, forming a mouth through which a card 150 may easily be inserted into the card holder 5. A section of the lower portion of the card holder 5 is removed to permit the notching device 15 to gain access to the notch sites 152 on the sorting edge 151 of card 150.

The memory unit 6 includes a pair of memory finger locating blocks 40 and 41 as shown in FIGURES 1–3. The front surface 52 of the finger locating block 40 is secured to the rear surface 53 of the carriage frame legs 32 and 34 by suitable means (not shown). The rear surface 54 of the finger locating block 40 is provided with a plurality of spaced parallel grooves or slots 42 as best shown in FIGURE 2. The spacing 55 between adjacent grooves 42 as well as the width of the grooves 42 are both equal to the spacing between alternate notch sites on the cards which defines the width of a notch site 152. The finger locating block 41 is also provided with spaced parallel grooves 43 whose spacing 56 and groove width are equal to the spacing between alternate notch sites 152 of the card 150.

As clearly shown in FIGURE 2, the locating block 41 is mounted to the finger locating block 40 so that the grooves 42 and 43 are parallel to each other, but laterally offset a distance equal to the groove width. With the grooves 42 and 43 laterally offset, the finger locating blocks 40 and 41, in combination, provide a row of contiguous notch sites 42, 43 of the card 150. Thus, there are 65 grooves 42, 43 whose combined width equals the combined width of the 65 notch sites of the card. In practice, the spacing of the grooves, which are milled, is achieved by precision indexing techniques with the result that the combined tolerance for the entire 65 groove assembly is no greater than the sum of the tolerances for two grooves. Thus, the "stacking" of tolerances is avoided.

Into each of the contiguous grooves 42, 43 is placed a memory finger 9, as shown in FIGURES 2 and 3. The memory fingers 9(a) positioned in the finger locating block 40 are substantially L-shaped, having a long leg 56 and a short leg 57. The leg 56 is not entirely enclosed in the groove 42, but rather has its rear marginal edge portion 44 projecting rearwardly from the block 40. The lower front corner 58 of the leg 56 of finger 9(a) is chamfered. The fingers 9(b) positioned in the grooves 43 of block 41 are also L-shaped, having a long leg 59 and a short leg 60. The front marginal edge portion 45 of the leg 59 projects slightly forwardly from the front surface of the rear block 41. The lower rear corner 39 of the finger 9(b) is also chamfered.

The spacing of the finger locating blocks 40 and 41 is such that the projecting marginal portions 44 and 45 of fingers 9(a) and 9(b), respectively, overlap. Shoulders 35 and 36 formed at the extremities of the grooved surfaces of the finger locating blocks 40 and 41, respectively, provide the spacing necessary to achieve this finger overlap, as shown in FIGURE 2. This overlap effectively forms the two rows fingers 9(a) and 9(b) into a single row of contiguous fingers 9.

The fingers 9(a) and 9(b) are longitudinally shiftable in the groves 42 and 43 between a lower position exemplified by finger 9(b) and an upper position exemplified by finger 9(a) (FIGURE 3). The extent to which the fingers 9 may be shifted downwardly is limited by the surface 37 of the block 41, which abuts the lower edge of the short legs 57 and 60 of the fingers 9(a) and 9(b), respectively. The extent to which the fingers 9 may be shifted upwardly is limited by the transversely disposed bar magnet 17 which abuts the upper edges of the short legs 57 and 60 of fingers 9(a) and 9(b), respectively. The fingers 9(a) and 9(b) are held in the upper or retracted position by the bar magnet 17, which is mounted to the rear surface of the finger locating block 40, as shown best in FIGURES 3 and 12.

As shown in FIGURES 3-6, a set of five finger setting solenoid actuators 10(a)–10(e) is provided to simultaneously set the fingers of a memory field in accordance with the character keyed in for the particular field. The finger setting solenoid actuators 10(a)–10(e) include five solenoids 48 having cores 51. The cores 51 are mechanically linked via a set of five levers 79 to the lower extremities of a set of five levers 49, the levers 49 being mounted at approximately their midpoints for pivotal movement about a transversely extending shaft 50 secured in the side frames 19 and 20 of the machine structure.

A keyboard coder (not shown), preferably of the type disclosed in copending application by Kalthoff et al. for "Console and Control Circuit," Ser. No. 539,792, filed Apr. 4, 1966 is utilized to selectively energize different pairs of the solenoids 48 in accordance with the character keyed into the keyboard, thereby generating the "two out of five" character code signals utilized in storing the character codes in the memory unit 6. The keyboard coder functions to transform the actuation of a single character key into the energization of a specified pair of solenoids 48, the particular pair of solenoids depending on the character key actuated.

In operation, as the carriage assembly 1, including the thirteen five finger memory fields, steps transversely in field-by-field fashion past the stationary set of solenoid actuators 10, the upper extremities of the set of five levers 49 become successively aligned with the thirteen memory fields, the five fingers per memory field corresponding to the five bits of a character field. Energization of a solenoid 48 in response to the keying in of a character for a given field, retracts core 51, pivoting the associated lever 49 counterclockwise about shaft 50, causing the upper extremity of the lever 49 to abut the upper edge of the short leg of the finger with which it is aligned, urging it away from, and free of, the bar magnet 17 into the set position as exemplified by finger 9(b) in FIGURE 3.

The carriage stepping mechanism 11, shown in FIGURES 3, 4 and 7, is provided for sequentially stepping the carriage in a field-by-field fashion along the guide rod 2 during the keying operation. The carriage stepping mechanism 11 includes an index bar 61 mounted to the upper end of the rear legs of the carriage frame 32, 34. Formed on the rear edge of the index bar 61 are thirteen teeth 62(1)–62(13), corresponding to the thirteen character fields 1–13 on the cards 150. The spacing between the teeth 62 is equal to the width of five notch sites constituting a character field.

Cooperating with the index bar 61 is a detent mechanism 63 as shown in FIGURES 4 and 7. The detent mechanism 63 includes a flap 64 mounted at its lower edge 80 for movement with a transversely and horizontally extending rod 65 which is secured at its ends to the side frame members 19 and 20. Formed on the upper edge of the flap 64 is a tooth 38. A link 66 pivotally mounted to the flap 64 at its lower extremity by a pin 81 also has a tooth 67 formed on its upper edge.

Figure 6:
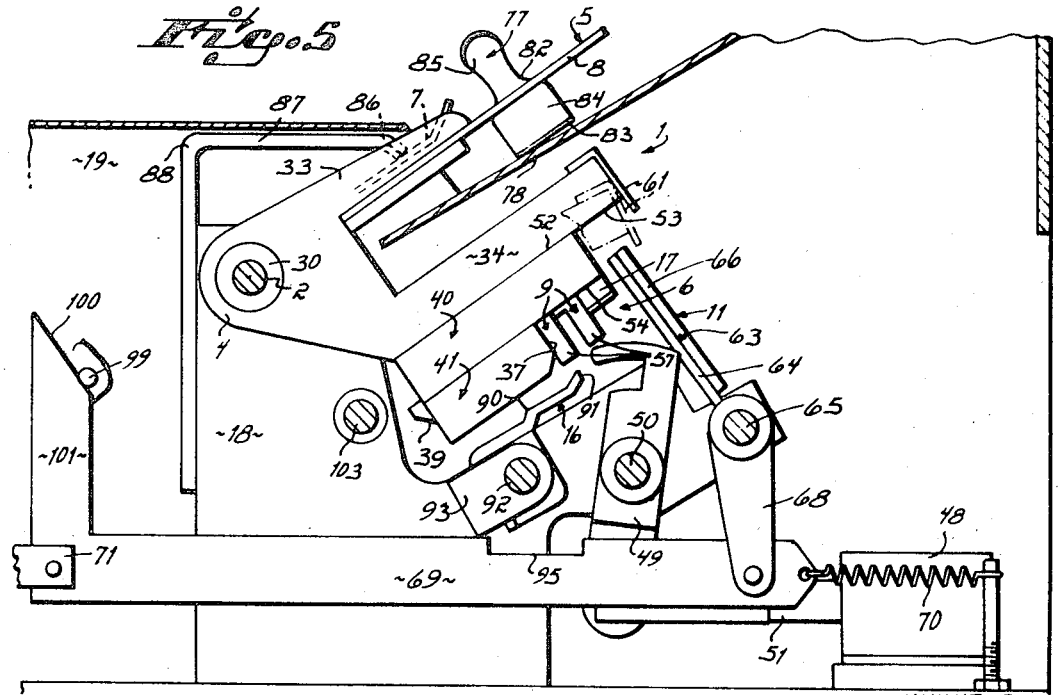
FIGURE 6 is a side elevational view of the carriage assembly in the raised position with the erasing mechanism disabled.

To rotate the rod 65, thereby pivoting the flap 64 and bringing the teeth 38 and 67 of detent mechanism 11 alternatively into alignment with the tooth 62 of index bar 61, a depending link 68 is provided, as shown in FIGURES 5 and 6. The link 68 is rigidly secured at its upper end to the rod 65 and at its lower end is pinned to a horizontal lever 69. The lever 69 is normally biased rearwardly by an extended tension spring 70, thereby aligning the tooth 67 on the link 66 with the tooth 62 on the bar 61 (FIGURE 3). When a carriage stepping solenoid core 71 is retracted by the momentary energization of a carriage stepping solenoid 72, this normal condition of tooth alignment is altered. Specifically, the lever 69 moves forwardly pivoting the link 68 clockwise, thereby momentarily substituting tooth 38 for tooth 67, aligning the tooth 38 with bar tooth 62.

The spring biasing device 21 is provided to continuously apply a biasing force to the carriage assembly 1, as shown in FIGURE 8. The spring biasing device 21 includes a coil spring member 22 which applies a substantially constant tension to the carriage assembly 1 via a flexible cable 23.

In operation, the carriage assembly 1 is stepped by successively energizing and de-energizing the stepping solenoid 72. When the solenoid 72 is de-energized the carriage assembly 1 is at rest. Referring to FIGURES 4 and 7, this rest condition results because the flap 64 is positioned, by the action of spring 70 and interconnecting links 69 and 68, so as to align tooth 67 of the detent mechanism 63 in abutting relation with the appropriate tooth 62 on the bar 61, thereby preventing carriage motion. If the solenoid 72 is now energized to initiate carriage stepping, the flap 64 pivots clockwise as a result of retracting core 71 moving lever 69, which in turn pivots lever 68 rotating shaft 65. This pivoting of flap 64 clockwise transfers the tooth 67 of the detent mechanism 63 from the tooth 62 of the bar 61 to the tooth 38 of the flap 64. Upon the completion of this transfer, the link 66 pivots counterclockwise (FIGURE 7) under the action of spring 76, pivoting tooth 67 of the detent mechanism 63 forward of tooth 38. Due to the fact that the tooth 62 of the bar 61 is engaged with tooth 38 of the detent mechanism, the bar 61 and, hence, the carriage assembly 1 cannot advance. However, when the solenoid is de-energized and the spring 70 returns the link 69 to its normal position, the flap 64 pivots counterclockwise, dropping tooth 38 of the detent mechanism behind tooth 62 of the bar 61, thereby allowing the spring biasing device 21 to advance the bar 61 rightwardly as viewed in FIGURES 4 and 7. The bar 61 continues advancing rightwardly until the succeeding tooth 62 on the bar 61 abuts the tooth 67 on link 66, which is now aligned with the teeth 62 on the bar 61, and pivots the link 66 clockwise to the extent permitted by a pin 74, which abuts the end of a slot 75 in the link 66. When the succeeding tooth 62 on the bar 61 has thus rotated the link 66 clockwise overcoming the force of a spring 76 which is connected between the link 66 and the flap 64, the bar 61 stops, having advanced a distance equivalent to one character or memory field which in turn corresponds to the width of five notch sites. Successive energization and de-energization of the stepping solenoid 72 will successively pivot the flap 64 clockwise and counterclockwise, respectively, producing successive stepping of the carriage assembly 1 on a field-by-field basis thereby facilitating the keying operation.

To return the carriage assembly 1 to the rightmost position, as viewed in FIGURE 1, corresponding to the initiation of a notching operation, the carirage assembly and attached index bar 61 is raised out of engagement with the teeth 38 and 67 of the detent mechanism 63 by pivoting it clockwise about the guide rod 2 and thereafter sliding the carriage assembly 1 laterally along the rod 2. When the carriage asembly 1 has been returned to the right-hand side of the machine, the carriage frame members 3 and 4 are pivoted clockwise lowering the index bar 61, thereby aligning the first tooth 62(1) on the index bar 61 with the tooth 67 on the link 66. With the teeth 67 and 62(1) so aligned, the index bar 61 is prevented from moving.

To conveniently raise the index bar 61 out of engagement with the teeth of the detent mechanism 63, an angulated lever 77 is provided as shown in FIGURES 4–6. The angulated lever 77 has a necked portion 82 intermediate a long leg 85 and short leg 84, which is loosely embraced by an aperture in the back panel 8 of the card holder 5. The end 83 of the short leg 84 abuts a stationary cam plate 78 which is secured to the side frame members 19 and 20 of the machine at a point intermediate the legs 31, 33 and 32, 34. When the upper end 85 of the angulated lever 77 is urged leftwardly, as viewed in FIGURE 4, the lever tends to pivot about the necked portion 82 raising the back panel 8 of the card holder 5 upwardly. As the back panel 8 is raised upwardly, the carriage frame side members 3 and 4 pivot counterclockwise, raising the teeth 62 on bar 61 out of engagement with the teeth 38 and 67 on the detent mechanism 63. When the bar 61 and detent mechanism 63 become disengaged, the leftward force applied to the angulated lever 77 is effective to slide the carriage transversely along the guide rod 2 to the leftmost position corresponding to the starting point of a card notching operation. The extremity 86 of a horizontally extending leg 87 which forms part of an L-shaped member 88 secured to the central frame support 18 limits the counterclockwise pivotal motion of the carriage assembly 1. If substantial pivotal motion is attempted, the front panel 7 of the card holder 5 abuts the extremity 86 of the leg 87, preventing further pivotal motion of the carriage assembly 1.

To facilitate erasing the memory unit 6, an erasing mechanism 16 is provided, as shown in FIGURES 3, 5, 6 and 11. This mechanism includes an L-shaped reset blade 90 having an upper edge 91 fixedly mounted for pivotal motion to a transversely extending shaft 92 which is journaled at its ends in the side frame members 19 and 20 of the machine. Secured to the lower leg of the L-shaped reset blade 90 is a weight 93 which applies a biasing torque to the reset blade tending to rotate it in the counterclockwise direction bringing the upper edge 91 of the reset blade into a position underneath the bottom surface of the legs 57 and 60 of the memory fingers 9(a) and 9(b), respectively.

The erasing mechanism 16 also includes a depending arm 96 which is secured to one end of the shaft 92 for rotation therewith. A notch 95 in the upper edge of the lever 69 is provided to enable the depending arm 96 to rotate counterclockwise free of the lever 69 under the action of the biasing torque produced by the weight 93, thereby positioning the edge 91 of the reset blade 90 in the erasing position, that is, beneath the memory finger legs 57 and 60. With the upper edge 91 of the reset blade 90 so positioned, as shown in FIGURE 5, any of the fingers 9(a) and 9(b) which happen to be set will be urged by the reset blade 90 into contact with the bar magnet 17 when the carriage assembly 1 is pivoted from a raised position to a lowered position, thereby erasing the memory 6 and preparing it for a keying operation.

The present coder further includes a hold capability effective to prevent the memory 6 from being erased as, for example, when it is desired to edge notch duplicate cards. In order to hold a code, it is necessary to position the lever 69 to the right, as viewed in FIGURES 5 and 6, displacing the notch 95. With the notch 95 displaced, as shown in FIGURE 6, the depending arm 96 is unable to swing clear of the lever 69 and thereby prevents the upper edge 91 of the reset blade 90 from being positioned beneath the legs 57 and 60 of the fingers 9(a) and 9(b), respectively, which in turn prevents the fingers 9 from being urged into contact with the magnet 17 when the carriage assembly is lowered. Thus, memory erasure is prevented.

Shifting of the lever 69 to selectively enable and disable the memory erasing mechanism 16 is accomplished by rotating an arm 97 about a stationary pin 98, causing a pin 99 secured to the outer periphery of the lever 97 to move up or down, depending on the direction of rotation of the lever 97, as shown in FIGURES 5, 6 and 11. This movement of the pin 99 cams the slanted edge 100 of a vertical extension 101 of the slanted lever 69 and functions to reciprocate both the extension 101 and the lever 69, shifting the position of the notch 95, and thereby enabling or disabling the reset blade 90 in accordance with the direction of reciprocation.

The sensing unit 12, as shown in FIGURES 1, 3, 8 and 12, is provided to sense the fingers 9 of the memory 6 which have been longitudinally shifted in response to the character keying operation. The sensing unit 12 comprises a wheel 102 mounted for rotation with a shaft 103. The shaft 103 at one end is connected to a gear 104. The gear 104 meshes with a gear 105 mounted for rotation with the guide rod 2. The other section of the shaft 103 passes through a bearing in the central support member 18 and is connected at its end to an apertured clutch plate 106 of the clutch 13, to be described in detail later. The wheel 102 has mounted about its peripheral surface a thread element or cam 107. The thread element 107 is circumferentially discontinuous with its ends 108 and 109 axially spaced a distance slightly larger than the thickness of the lower end of a memory finger 9. The portion of the thread element 107 extending circumferentially from the end 108 is helical through an angle of approximately 120 degrees, while the portion of the thread element extending circumferentially from end 109 has no pitch through an angle of approximately 240 degrees. The thread element 107 extends radially a distance sufficient to insure that as the carriage assembly 1 steps leftwardly along the guide rod 2 longitudinally shifted fingers 9(a) and 9(b) will abut the thread element 107, that is, will be sensed by the cam 107, initiating a notching cycle in a manner to be described.

The notching device 15 includes a wheel 110 mounted for rotation with the guide rod 2, as shown in FIGURES 1, 3, 13 and 14. The wheel 110 has a notching punch 111 projecting radially from the periphery of the wheel 110. The notching punch 111 cooperates with a slotted die 112, which is fixedly mounted to the stationary central vertical support member 18. If the sorting edge 151 of a card 150 is positioned on the upper surface 114 of the die 112, a notch is produced at the notch site 152 located above the slot 115 when the notching punch 111 passes through the slot 115 in response to the rotation of the wheel 110. One preferred form of notch has a width of 0.08 inch and a depth of 0.0625 inch.

The drive assembly for powering the finger sensing unit 12 and the notching device 15 includes a continuously operating motor 126 which has fixed to its shaft 127 a drive gear 14 rotating in the direction of arrow 128, as shown in FIGURES 1, 8 and 10. The continuously driven gear 14 drives a gear 129 in the direction of arrow 130 via a pair of idler gears 131 and 132. The gear 129 comprises a portion of the clutch 13 and is mounted for rotation about a stepped diameter stub shaft 133 which is fixed to the side frame member 19 at its left end 134 by a fastener 135 as shown in FIGURE 9. The free end 136 of the stepped diameter shaft 133 has a radially enlarged portion forming a flange 144. The inner shoulder of the flange 144 restricts the axial motion of the gear 129 in the rightward direction, leftward axial motion being restricted by the abutment of hub 137 with the inside surface of the side frame member 19.

The clutch plate 106 which is coaxially mounted to the end of the shaft 103 by a pin 145 has a plurality of equally circumferentially spaced apertures 139. A pin 140 is mounted to the gear 129 and has an axially extending end portion 141 which, when the clutch 13 is engaged, protrudes into one of the spaced apertures 139 forming a driving connection between the gear 129 and the clutch plate 106. Under normal conditions the clutch 13 is disengaged by the action of a spring 142. The spring 142 fits in a cylindrical cavity 143 formed in the end of the shaft 103 and biases the shaft 103 away from the free end 136 of the shaft 133. When the shaft 103 is so biased, the apertured clutch plate 106 is spaced away from the gear 129 causing the pin end 141 to fall short of entering an aperture 139 resulting in clutch disengagement. The clutch 13 is engaged when the shaft 103 is shifted axially to the left, urging the clutch plate 106 toward the gear 139 causing the pin end 141 to enter one of the apertures 139. This axial shifting of shaft 103 occurs when one of the memory fingers 9 which has been longitudinally shifted during the character keying operation abuts the thread element or helical cam 107 during the notching cycle, driving the finger sensing unit 12 leftwardly. The force necessary for driving the finger sensing unit 12 leftwardly is produced by the biasing action of the spring 22 connected to the carriage frame member 4 via the flexible cable 23.

Operation

The production of edge notched cards with the machine of this embodiment is accomplished by first erasing the memory unit 6 and returning the carriage assembly 1 to the right-hand side of the machine as viewed in FIGURE 1. Both erasing and returning can be achieved in a single, unified operation and without energizing either the motor 126 or any of the solenoids. Specifically, to erase and return, the lever 97 is first rotated clockwise (FIGURE 11) camming the lever 69 leftwardly. This positions the notch 95 beneath the arm 96, permitting the reset blade 90 to rotate counterclockwise, positioning the blade edge 91 beneath the legs 57 and 60 of the fingers 9 when the carriage assembly 1 pivots upwardly.

The second essential step to erasing and returning is pivoting the carriage assembly 1 upwardly. This is accomplished by gripping the angulated lever 77 and urging it leftwardly (FIGURE 4), or rightwardly (FIGURE 1). When the lever 77 is so urged, the lever pivots about the necked portion 82 raising the carriage assembly 1 and disengaging the detent mechanism 63 and index bar 61. In addition, as the carriage assembly 1 is raised, the reset blade 90 rotates positioning the edge 91 beneath the legs 57 and 60 of the fingers.

Further urging of the lever 77 leftwardly (FIGURE 4) following the disengagement of the detent mechanism 63 and the bar 61 causes the entire carriage assembly 1 to transversely shift along the guide rod 2, overcoming the force of the biasing spring 22. When the carriage assembly has been fully shifted, the lever 77 is released allowing the carriage assembly 1 to pivot downwardly. As the carriage assembly 1 pivots downwardly, the tooth 62(1) on the index bar 61 engages the tooth 38 of the detent mechanism 63 thereby preventing the carriage assembly 1 from shifting transversely. The lowering of the carriage assembly 1 also causes the edge 91 of the reset blade 90, which is positioned beneath the legs 57 and 60, to move the set fingers 9 upwardly, returning them to the bar magnet 17, thereby erasing the character code signals stored in the memory unit 6 during the previous keying operation. The relative motion between the carriage assembly 1 and the reset blade 90 has the further effect of pivoting the reset blade clockwise, thereby raising the arm 96 out of the notch 95.

Having returned the carriage assembly 1 and erased the memory unit 6, the machine is ready to perform the character keying-card notching operation. The first field of memory fingers, designated 9–(1)(a), 9–(1)(b), 9–(1)(c), 9–(1)(d), and 9–(1)(e) in FIGURE 12, is positioned opposite the set of five levers 49(a)–49(e) comprising solenoid actuators 10(a)–10(e). The exact relationship of the sensing device 12 and the first field of fingers 9–(1)(a) to 9–(1)(e) at the start of a notching operation is not critical except to the extent that the sensing device 12 must be to the left of finger 9–(1)(a), as viewed in FIGURE 12. This enables the thread element or cam 107 of the sensing device to successively abut the ends of the set fingers in the first field to thereby actuate the notching device 15 as the carriage assembly 1 moves leftwardly under the action of the spring 22. It is preferable, from the standpoint of reducing the time required for notching a card, to position the sensing device 12 as close to the solenoid actuators 10 as possible. This reduces the time between the setting of the memory fingers 9 and the subsequent sensing-notching operation, reducing the over-all time required to notch the card.

The relationship of the notching device 15 to the sensing device 12 and memory unit 6 is not critical. However, once the relationship between notching device 15, sensing device 12 and memory unit 6 is selected, it is essential that the card 150 be positioned relative to the notching device 15 in a manner such that when a particular memory finger 9 is being sensed, the notch site 152 on the card, which corresponds to the sensed finger, is located at the notching station. For example, notch site 152 (1)(a) should be positioned over the die slot 115 of the notching device 15 as finger 9–(1)(a) is sensed, notch site 152–(1)(b) should be positioned over the die slot as finger 9–(1)(b) is sensed, etc. This relationship insures that when a finger, which has previously been set, is sensed thereby actuating the notching device 15, the notch site corresponding to that finger will be positioned over the die slot 115 and be notched as the punch 111 passes through the slot.

The desired ones of the memory fingers 9–(1)(a) to 9–(1)(e) of the first field are set by the levers 49(a)–49(e) of solenoid actuators 10(a)–10(e) which are aligned therewith by suitably energizing the solenoids 48. For example, if it is desired to produce a notch at sites 152–(1)(a) and 152–(1)(b) of the card 150 corresponding to the digit "1" of a "two out of five" code, it is necessary to set memory fingers 9–(1)(a) and 9–(1)(b). This is accomplished by energizing the solenoids 48 associated with the levers 49(a) and 49(b) which pivot the levers 49(a) and 49(b) urging the memory fingers 9–(1)(a) and 9–(1)(b) downwardly to the positions shown in FIGURE 12, thereby setting the fingers 9–(1)(a) and 9–(1)(b). The remaining three fingers 9–(1)(c) to 9–(1)(e) of field 1 which are not set by their associated levers 49(c)–49(e) are held in the upper, erased position by the bar magnet 17.

Having set the desired fingers in the first field 1, the carriage assembly 1 is stepped to the next field 2. Concurrently with the stepping, the field of fingers 9–(1)(a) to 9–(1)(e) are sensed by the sensing device 12. Stepping is accomplished by momentarily energizing the stepping solenoid 72 which momentarily retracts the spring biased core 71 and lever 69, momentarily pivoting the arm 68 clockwise. The momentary pivoting of the arm 68 rotates the shaft 65, pivoting the flap 64 which, when it returns to its normal, unpivoted position upon deenergization of the solenoid 72, disengages the detent mechanism and the tooth 62(1) of the index bar 61, thereby releasing the spring biased carriage assembly 1 to the extent of a single field. When the carriage assembly 1 is released, the carriage assembly advances rightwardly, as viewed in FIGURE 12, under the action of the spring 22. The maximum the carriage assembly 1 can shift uninterrupted is the width of a single field, that is, until the detent mechanism 63 engages the tooth 62(2) on the index bar, at which time the solenoid actuators 10(a)–10(e) become aligned with the memory fingers 9–(2)(a) to 9–(2)(e) of field 2. The carriage assembly 1 will not ordinarily shift uninterrupted the width of a full field except in the case where none of the fingers of that field has been set. Therefore, in the example herein where the fingers 9–(1)(a) and 9–(1)(b) are set, the carriage assembly 1 only shifts until the set finger 9–(1)(a) abuts the thread or cam 107 of the sensing device 12, initiating the notching cycle.

More specifically, in the example herein when the detent mechanism 63 is disengaged from the tooth 62(1), the carriage assembly 1 shifts a distance equal to the spacing between the actuators 10 and the sensing device 12 whereupon the projecting set finger 9–(1)(a) abuts the stationary thread element or cam 107 approximately at the point shown in FIGURE 3, that is, on the pitchless portion of the thread element extending from the end 109. When this occurs, the shaft 103 is slightly shifted toward side frame member 19 engaging the clutch 13 whereupon the carriage comes to rest with notch site 152–(1)(a) positioned over the die slot 115. Assuming the gear 129 is being driven by the motor 126, the engaging of the clutch 13 rotates the shaft 103 driving the wheels 102 and 110 in the direction of the arrows 146 and 113, respectively, at the same angular velocity. This rotation advances the punch 111 approximately 120 degrees to the die slot 115 producing a notch at notch site 152–(1)(a) (see FIGURES 13 and 15). During this time the wheel 102 rotates an equal amount, producing relative motion between the thread element 107 and the finger 9–(1)(a). The carriage assembly 1 remains at rest, however, because during this time the finger 9–(1)(a) is in sliding contact with the pitchless portion of the thread element. The carriage assembly 1 continues to remain at rest as the wheels 110 and 102 rotate until the helix portion of the thread element has advanced to the point where it is in contact with the set finger 9–(1)(a). Once this point on the cam 107 is reached further rotation of the wheel 102 allows controlled shifting of the spring biased carriage 1, the shifting being controlled for an angular rotation of approximately 120 degrees by the helical portion of the thread against which abuts finger 9–(1)(a). At the end of this 120 degrees of shifting, the finger 9–(1)(a) passes between the ends 108 and 109 of the thread element 107 and the carriage assembly 1 is again free to shift to either the next successive set finger of the first field, or until the detent mechanism 63 engages tooth 62(2) marking the beginning of the second field 2. In the example herein, the finger 9–(1)(b) is also set. Thus, the carriage 1 shifts until the cam 107 abuts the set finger 9–(1)(b) whereupon a notch is produced at site 152(1)(b), as a consequence of the initiation of the notching cycle by the abutment of the cam 107 and set finger 9–(1)(b), in the manner described previously. If, however, only one finger in field 1, finger 9–(1)(a), had been set, the carriage assembly would shift, following the notching of site 152–(1)(a), until stopped by the engagement of the detent mechanism 63 and the tooth 62(2) corresponding to the beginning of the second field 2. When a sensed finger, such as set finger 9–(1)(b) passes free of the thread element 107 at the end of a notching cycle, the shaft 103 is returned by the spring 142 to its normal position, disengaging the clutch 13. With the clutch 13 disengaged the wheels 102 and 110 coast to a stop in the approximate angular orientations shown in FIGURE 3.

When the carriage assembly 1 has come to rest due to the engagement of the tooth 62(2) on the index bar 61 with the detent mechanism 63, the fingers 9–(2)(a) to 9–(2)(e) are aligned with the levers 49(a)–49(e), respectively, and the keying of the second character can be initiated. If it be assumed that it is desired to notch sites 152(2)(a) and 152(2)(d) corresponding to the digit "4" in a "two out of five" code, the appropriate solenoids 48 are energized to pivot levers 49(a) and 49(d) thereby setting fingers 9–(2)(a) and 9–(2)(d), respectively. With the desired fingers set, the stepping solenoid 72 is momentarily energized, disengaging tooth 62(2) and the detent mechanism 63, thereby freeing the carriage assembly and allowing it to shift under the action of the spring 22. The carriage assembly shifts until finger 9–(2)(a) abuts the thread element 107 of the sensing device 12, engaging the clutch 13 for a single revolution thereby notching site 152–(2)(a) on the card 150 (see FIGURE 15).

Following the disengagement of the clutch 13 at the end of the notching cycle during which site 152–(2)(a) was notched, the carriage assembly 1 shifts an additional amount until the set finger 9–(2)(d) is sensed by the sensing device 12 producing a notch at site 152–(2)(d) (see FIGURE 15). When this has occurred, the carriage assembly 1 again shifts. Since no further fingers have been set in field 2, the carriage assembly 1 shifts until tooth 62(3) on the index bar 61 engages the detent mechanism 63 whereupon the carriage stops, aligning the third field of fingers 9–(3)(a) to 9–(3)(e) with the levers 49(a)–49(e). The machine is now ready for keying in of the code for the third field which is done in a manner similar to that described for fields 1 and 2.

If no character is to be entered in a given field, for example in field 3, none of the actuators 10(a)–10(e) is energized and, hence, none of the fingers 9–(3)(a) to 9–(3)(e) is set. Thus, when the stepping solenoid 72 is momentarily energized disengaging the tooth 62(3) of the index bar 61 and the detent mechanism 63, the carriage will shift uninterrupted for an entire field, that is, until the tooth 62(4) engages the detent mechanism 63 stopping the carriage assembly 1 at the fourth field 4.

Following the keying in of the desired characters in all the fields and notching of the sites corresponding to these keyed in characters, the carriage assembly comes to rest with the detent mechanism 63 in engagement with the shoulder 155 of the index bar. The notched card 150 can now be removed from the card holder 5 and an unnotched card inserted in its place.

If duplicate cards are desired, the carriage assembly 1 is returned to the right-hand side of the machine, as viewed in FIGURE 1. However, before returning the carriage assembly 1 it is necessary to disable the erasing mechanism 16, otherwise when the carriage assembly 1 pivots downwardly at the end of the carriage return operation, the memory unit 16 will be erased in the same manner as it was when the carriage assembly 1 was returned prior to the keying in of the stored characters. To disable the erasing mechanism 16, the lever 97 is rotated counterclockwise, raising pin 99 which allows the extension 101 and lever 69 to move rightwardly, as viewed in FIGURE 11, under the action of the spring 70. When this occurs, the notch 95 shifts from beneath the arm 96 preventing the arm 96 from rotating counterclockwise, which in turn prevents the edge 91 of the reset blade 90 from moving to a position beneath the legs 57 and 60 of the fingers 9. With the edge 91 out from beneath the fingers 9, no erasing can result when the carriage assembly 1 drops downwardly at the end of a carriage return operation.

Having disabled the erasing mechanism 16, the carriage assembly 1 is now returned to the right-hand side of the machine, as viewed in FIGURE 1, by urging the lever 77 rightwardly in the manner described previously. The carriage assembly 1, unlike the first time it was returned, does not remain at rest. It will be remembered that the first time the carriage assembly 1 was returned, that is, prior to the keying-in operation, the memory unit 6 was to be erased and to accomplish the erasing the lever 69 was shifted to the left, as viewed in FIGURE 5, to position the notch 95 beneath the arm 96, thereby enabling the erasing mechanism 16. This shifting of the lever 69 also pivoted the lever 68 rotating the shaft 65 and pivoting the flap 64, thereby engaging the detent mechanism 63 and the index bar 61. Thus, enabling the erasing mechanism 16 prior to the keying-in operation also engaged the detent mechanism 63. However, when duplicate cards are desired, the memory unit 6 is not to be erased and, consequently, the erasing mechanism 16 is disabled. However, disabling the erasing mechanism 16 which is done by shifting the lever 69 has an additional effect, namely, it pivots the flap 64 counterclockwise, disengaging the detent mechanism 63 from the index bar 61 (FIGURE 6), and thereby disabling the stepping mechanism 11. Thus, when the carriage assembly 11 is returned preliminary to duplication with the stepping mechanism 11 disabled, there is nothing to hold the carriage assembly at rest and, therefore, the carriage assembly immediately upon return starts to shift leftwardly under the action of the spring 22.

The carriage assembly 1 shifts until the sensing cam 107 abuts the first set finger, finger 9–(1)(a), whereupon it stops and a notching cycle is initiated producing a notch at site 152–(1)(a). Following the notching of site 152(1)(a), the carriage assembly 1 again shifts, this time until the sensing cam 107 abuts set finger 9–(1)(b) whereupon a notch is produced at site 152–(1)(b). Thereafter the carriage shifts until the sensing cam 107 abuts set finger 9–(2)(a) whereupon a notch is produced at site 152–(2)(a). It is to be noted that the carriage assembly 1 does not come to rest at the beginning of each field by the engagement of the detent mechanism 65 with the spaced teeth 62 of the index bar 61, as was the case previously when the characters for the various fields were being keyed in and the memory fingers set. With duplication, the memory fingers are already set and, hence, there is no need to arrest the carriage assembly 1 except when set fingers are sensed. Therefore, if no fingers had been set in field 2, the carriage assembly 1 would shift through the second field stopping at the next set finger which might be, for example, finger 9–(3)(d). Thus, the time required for a duplicate notching operation cannot be longer than for a keying-notching operation and in most cases will be less depending on the number of fields having no set fingers. The carriage assembly 1 continues shifting and notching in the above manner until all the set fingers have been sensed, whereupon it comes to rest.

If further duplication is required, the carriage is returned, without erasing the memory unit 6, in the manner just outlined, and the shifting and notching process repeated. When new codes are to be notched, the memory unit 6 must be erased, which also activates the stepping mechanism 11, thereby insuring that the carriage assembly 1, when returned, will step from field-to-field permitting the characters to be keyed in at each field and the memory fingers set, storing the character code signals.

While in the duplicating mode of operation, the stepping solenoid 72 and the bit solenoids 48(a)–48(e) are disabled to avoid their actuation should a character key or the space key of the keyboard unit be inadvertently actuated by the operation. Disablement of these solenoids 48(a)–48(e) and 72 is effected by the movement of the arm 97 to its duplicating mode position. More specifically, as the lever 97 is rotated counterclockwise about pin 98, as viewed in FIGURE 11, to thereby disable the erasing mechanism, a cam surface provided on the lower left peripheral portion of the lever 97 trips a suitably positioned microswitch which interrupts an electrical circuit to the solenoids 48 and 72, disabling the solenoids.

NON-DUPLICATING CODER

General description

For edge notching applications in which the ability to duplicate edge notched cards is not a necessary capability, edge notching apparatus may be employed which does not have the memory feature present in the previously described embodiment. By utilizing a machine without a memory in such applications, the machine capabilities are appropriately matched to the needs of the user thereby realizing the economies inherent in the use of less complicated apparatus. To this end a second embodiment comprising a memoryless edge notching apparatus and utilizing the principles of this invention has been provided, as shown in FIGURES 16–23.

The memoryless edge notching machine, as clearly shown in FIGURE 16, includes a cover 300 designed to enclose substantially the entire operating mechanism of the apparatus. A slot 301 extending from one side of the top surface 302 of the cover 300 to the other side thereof is provided to allow that portion of the operating mechanism not enclosed, namely, the carriage 303, to project through the cover. The slotted cover 300 facilitates the placing of a card 304, which is similar in identity to the card 150 shown in FIGURE 15, in the carriage 303 prior to notching, permits transverse motion of the carriage during notching for reasons to be described, and allows the card to be removed once it has been notched.

Referring now to FIGURE 17, the memoryless edge notching embodiment is shown with the cover 300 removed. The machine, in addition to the transversely movable carriage 303, includes a stationary notching station 305 through which the sorting edge 306 of the card 304 moves leftwardly, field-by-field, during the edge notching operation. The machine further includes a group of five solenoids 307(a)–307(e). The solenoids 307(a)–307(e) are selectively operable and through suitable associated mechanical linkages, function to cause one or more of five notching punches, which correspond to the five bits or notch sites in a character field, to become operative thereby edge notching the various ones of the notch sites in a character field in accordance with the particular character key actuated. A card stepping mechanism including a toothed bar 312 mounted for movement with the carriage 303 cooperates with an escapement mechanism (not appearing in FIGURE 17) for stepping the sorting edge 306 of the card 304, field-by-field through the notching station 305. The timed operation of the stepping mechanism and the punch-actuating solenoids 307(a)–307(e) is controlled by a suitable keyboard (not shown).

Detailed description

The carriage 303 in more detail includes a pair of spaced guide blocks 313, 314, as clearly shown in FIGURES 18 and 20. Each block 313, 314 is provided with a journal bearing 315, 316, respectively, through which slidably passes a transverse guide rod 317. The guide rod 317 is secured at its ends to a pair of side frame members 319, 320. Connected between and secured to the lower ends of the guide blocks 313, 314 in any suitable manner is the toothed index bar 312. Connected between and supported by the upper ends of the guide blocks 313, 314 is a card holder 321. The card holder 321 is preferably fabricated from a piece of sheet metal stock which is folded into two portions along a center line 322. The two portions are then formed parallel to each other and spaced slightly apart constituting front and back panels 325, 326 for vertically receiving and supporting the card 304. The upper margin 323 of the front panel 325 is slightly flared, as best shown in FIGURE 17, to form a mouth through which the card 304 may be easily inserted into the card holder 321.

To maintain the proper spacing betwen the front and back panels 325, 326, a pair of spacers 327, 328 are provided. The spacers 327, 328 which are positioned between the panels 325, 326 have a thickness slightly greater than the thickness of a card 304, thereby preventing the front and back panels 325, 326 from being urged together so as to pinch the card. The opposing edges of the spacers 327, 328 include upper sloping portions 329, 330 and lower vertical portions 331, 332. The upper sloping portions 329, 330 jointly function to guide the card into proper registration with the card holder 321 by acting as cam surfaces for the lower corners of the card 304. The lower vertical portions 331, 332 of the spacers 327, 328 function as spaced stops against which the vertical edges of the card 304 abut, thereby maintaining proper lateral registration of the card 304 relative to the card holder 321.

A pair of cooperating levers 333, 334 pivotally mounted at their lower extremities to the card holder 321 are provided to prevent the card 304 from shifting vertically during the edge notching operation. A horizontally extending knob 335 pinned to the upper extremity of the lever 334 clamps the card 304 in the inserted position when the levers have been pivoted to the lower position shown in FIGURE 18. A pin 336 on the lever 333 projects through a centrally disposed slot 337 in the lever 334 ond controls the motion of the levers as they are moved between the lower, card-clamping position and the upper, non-clamping position (shown in phantom lines in FIGURE 18).

A finger-engaging tab 338 is affixed to the card holder 321 in any suitable manner and, when urged rightwardly, slides the carriage 303 transversely on the guide rod 317 to the rightmost carriage position thereby readying the machine for an edge notching operation. With the carriage in the rightmost position the first character field of the card 304 is positioned at the notching station 305.

The lower portion of the card holder 321 has a section 340 removed therefrom as clearly shown in FIGURE 18. The length of the removed section 340 is coextensive with notch sites comprising the thirteen juxtaposed character fields. In actual practice, the length of the removed portion 340 is made slightly larger than the lengthwise dimension of the plurality of notch sites to provide clearance between the vertical edges 341, 342 of the removed section 340 and the sides 343, 344 of the notching station 305. This clearance prevents interference between the card holder 321 and notching station 305 when the extreme notch sites are being notched.

The notching station 305, as shown in FIGURES 18, 19 and 20 includes a punch guide 350. The punch guide 350 is supported in operative position by a vertical column 351, which in turn is secured to the bottom frame member 352 of the notching machine. More specifically the punch guide 350 is supported in a channel formed by a pair of upwardly extending arms 353, 354 which constitute the upper portion of the vertical column 351. The arms 353, 354 securely embrace the lateral surfaces 355, 356, respectively, of the punch guide 350 thereby constraining the horizontal motion of the punch guide. Formed in the internal surfaces of the arms 353, 354 are a pair of horizontal shoulders 357, 358 upon which seat the lateral edges of the bottom surface 359 of the punch guide 350.

As shown in FIGURES 18, 19 and 20 the punch guide 350 houses five punches 361(a)–361(e) corresponding to the five bits of a character field. Structurally, each of the punches 361(a)–361(e) is identical, being generally of rectangular shape as best shown in FIGURE 20. The punches 361(a)–361(e) are provided with two horizontally disposed slots at opposite ends of the punch, one slot 366 being internal and the other slot 367 being open, for reasons to be described later. In addition, each of the punches 361(a)–361(e) has a vertical groove or slot 368 into which the sorting edge 306 of the card 304 is positioned when the vertically disposed punches 361(a)–361(e) are aligned in the non-notching position, that is, in juxtaposition with their lateral surfaces 369 in sliding contact with those of adjacent punches. When the punches 361(a)–361(e) are aligned in the non-notching position as shown best in FIGURE 20, one of the pair of horizontally disposed pins 371, 372 contacts the inner end of one of the pair of slots 366, 367.

Notching is effected by longitudinally shifting the punches 361(a)–361(e). To produce this shifting, solenoids 307(a)–307(e) are provided. The solenoid cores 376(a)–376(e) (FIGURE 17) are pinned at their upper ends to one end of a set of levers 381(a)–381(e), each solenoid core being pinned to a different lever. The levers 381(a)–381(e) at their other end are each provided with a vertically extending finger 386 (FIGURE 20). Each of the fingers 386 at its upper extremity is rounded and fits through a slot 395 in the base of the punch guide 350 into a notch 387, each finger 386 being associated with a different punch 361(a)–361(e). In addition, each of the fingers 386 at its other extremity 388 is provided with an aperture 389 through which the stationary rod 317 passes, thereby permitting the levers 381(a)–381(e) to pivot as the solenoid cores 376(a)–376(e) are retracted.

In operation, when lateral shifting of one of the punches, for example, punch 361(e) (FIGURE 20) is desired, solenoid 307(e) is energized, retracting core 376(e) thereby pivoting the lever 381(e) clockwise about the rod 390. This pivotal movement swings the rounded end of the finger 386 to the right sliding the punch 361(e) to the right, also. As the punch 361(e) slides, the notch site of the card 304 positioned in the groove 368 of the punch is notched, the adjacent punches or punch guide 350, as the case may be, serving as a slotted die. When the solenoid 307(e) is de-energized, the lever 381(e) returns to the non-retracted position as a result of an upward force exerted by a biasing spring 391, thereby returning the punch 361(e) to its centered position. The return motion of the punch 361(e) is limited by the abutment of the inner end 392 of the slot 367 with the pin 371. In a like manner, the longitudinal motion of the punch 361(e) during the notching operation is limited by the abutment of the inner end 393 of the slot 366 with the pin 372. Thus, during a notching operation, a punch moves from a centered, non-notching position to a longitudinally shifted, notching position, and then returns to the centered position depicted in FIGURE 20.

To conveniently fit the solenoids 307(a)–307(e) and associated levers 381(a)–381(e) into the available space and avoid mechanical interference, successive solenoids and levers are positioned on opposite sides of the notching station 305, as clearly shown in FIGURE 17. Specifically, solenoids 307(a), 307(c) and 307(e) and associated levers 381(a), 381(c) and 381(e) are positioned in the front portion of the machine, while solenoids 307(b) and 307(d) and associated levers 381(b) and 381(d) have been positioned in the rear portion of the machine.

A carriage stepping mechanism including toothed bar 312 is provided to successively register adjacent character fields at the notching station 305. The toothed bar, as shown in FIGURE 18, has a set of thirteen depending teeth 401(1)–401(13) corresponding to the thirteen character fields 1–13 on the sorting edge 306 of the card 304. The spacing between the vertical edges of adjacent teeth is equal to the width of a character field on the card, which in turn is equal to the width of five notch sites. When the card 304 is properly registered in the card holder 321, the character fields 1–13 are aligned with the teeth 401(1)–401(13), respectively. That is, the beginning of character field 1 is aligned with the vertical edge of tooth 401(1), the end of character field 1 and the beginning of character field 2 are aligned with tooth 401(2), the end of character field 2 and beginning of character field 3 are aligned with tooth 401(3), etc.

A detent assembly 414 also forms part of the carriage stepping mechanism, as is shown in FIGURES 17, 18, 21–23. The detent assembly includes a vertically extending flap 415 hinged at its lower edge 416 to a pin 417 horizontally mounted in the base of the vertical support 351. The flap 415 has a horizontally and laterally extending arm 418 to which is attached a linkage 419 connecting the arm 418 to a core 420 of a stepping solenoid 421 (FIGURE 17). The connection of the linkage 419 to the arm 418 is eccentric to the pin 417. Thus, when the solenoid 421 is energized retracting the core 420 and overcoming the spring 422, the linkage 419 moves rearwardly pivoting the flap toward the rear about pin 417.

Pinned to the flap 415 by a pin 423 is a toothed link 424. The link 424 is free to pivot clockwise, as viewed in FIGURES 16–18, to the extent permitted by a pin 425 which is mounted on the flap 415. A toothed wheel 426 is rotatably mounted on the link 424 by a pin 427. Slots 428 and 429 in the wheel 426 and link 424, respectively, are provided and cooperate with the pin 425 to permit the flat edges of teeth 430 and 431 on the wheel 426 and link 424, respectively, to become aligned with each other and with the various teeth 401(1)–401(13) on the bar 312. A spring 433 connected between the pin 425 and a pin 434 mounted on the wheel 426 urges the wheel 426 and the link 424 counterclockwise and clockwise, respectively, as viewed in FIGURES 21–23.

The clockwise pivotal motion of the flap 415, as viewed in FIGURE 20, is limited, for reasons to be described, by a screw 435 which is threaded in a tapped hole in the vertical support 351. When the flap 415 abuts the screw 435, as shown in FIGURE 20, the tooth 430 on the wheel 426 is aligned with the teeth 401(1)–401(13) of the bar 312. The pivotal motion of flap 415, in the counterclockwise direction, is limited by the abutment of the upper edge 436 against the toothed bar 312. When the bar 312 and the edge 436 abut, the tooth 431 of the link 424 is aligned with the teeth 401(1)–401(13) of the bar 312.

A pair of opposed screws 437, 438 are threaded in tapped holes in the vertical support 351 and function to guide the bar 312 as it traverses the machine during a notching operation. Specifically, the screws 437, 438 insure that the bar 312 does not shift laterally as viewed in FIGURE 20, thereby providing proper engagement of the teeth 401(1)–401(13) on the bar 312 with the teeth 430 and 431 on the wheel 426 and link 424, respectively.

A spring mechanism 450 (FIGURE 18) applies a constant biasing force on the carriage 303 via a flexible cable 451 connected between the spring mechanism and the guide block 314. The direction of the bias force is such as to advance the carriage 303 through a notching operation to be described.

In operation, the flap 415 is normally in abutting relationship with the screw 435. Thus, the tooth 430 of the wheel 426 is aligned with the teeth 401(1)–401(13) of the bar 312 and, hence, the card carriage 303 is at rest with one of the teeth 401(1)–401(13) of the bar 312 being engaged with the tooth 430 of the wheel 426 as best shown in FIGURE 21.

To space the carriage, the spacing solenoid 421 (FIGURE 17) is energized retracting the core 420 and linkage 419, thereby pivoting the arm 418 and flap 415 counterclockwise, as viewed in FIGURE 20. This pivoting of the flap 415 transfers the tooth 401(1), assuming character field 1 is positioned at the notching station 305, from the tooth 430 to the tooth 431. When this transfer occurs, the wheel 426 rotates counterclockwise under the action of the spring 433 to the position shown in FIGURE 22. At this point in time, the carriage 303 has still not moved. The tooth 430 that was restraining the motion of the bar 312 has shifted. Tooth 431 now engages the tooth 401(1), and the flap edge 436 now abuts the bar 312 instead of the screw 435, as was the case previously.

To complete the stepping operation and advance the bar 312 and carriage 303 the width of a character field, the solenoid is de-energized, permitting the flap 415 to return to abutting relationship with the screw 435 under the action of spring 422. When this occurs, the tooth 431 drops behind the tooth 401(1) on the bar 312 bringing tooth 430 into alignment with tooth 401(2). The bar 312 and carriage 303 will now advance rightwardly (FIGURE 18) under the action of the spring mechanism 450 and cable 451 until the tooth 401(2) contacts tooth 430 (FIGURE 23) and rotates the wheel 426 clockwise to the extent permitted by the pin 425 and slot 427. When this limited rotation of the wheel 426 has occurs, the second character field 2 is aligned with the notching station 305, that is, the five notch sites comprising character field 2 are aligned, respectively, with the five punches 361(a)–361(e).

The above stepping cycle is repeated, with the carriage 303 advancing a field at a time, each time the solenoid 421 is momentarily energized.

To return the bar 312 and carriage 303 to the leftmost position which corresponds to the beginning of a notching operation, the tab 338 is urged to the left, as viewed in FIGURE 18. If the flap 415 happens to be in the normal position at this time, that is, abutting screw 435, with the teeth 401(1)–401(13) aligned with tooth 430 on wheel 426, the slanted edges of teeth 401(1)–401(13) cam the tooth 430, rotating the wheel 426 clockwise as the carriage 303 moves leftwardly, as viewed in FIGURES 21–23. The camming action rotates the wheel 426 until the pin 425 abuts the end of the slot 427 whereupon further camming action pivots the link 424 about the pin 423, thereby allowing the teeth 401(1)–401(13) to move leftwardly relative to tooth 430. Spring 433 returns the wheel 426 and the link 424, following the camming action, to the positions they occupied prior to initiating the carriage return. If the flap 415 is not in the normal position when the tab 338 is urged to the left, that is, if the flap 415 has its edge 436 abutting the bar 312, the tooth 431, when the carriage returns, is cammed by the teeth 401(1)–401(13) directly pivoting the link 424. Thus, regardless of the position of the flap 418, the carriage 303 can return to the leftmost position.

Operation

To edge notch a card, a card 304 is inserted in the cardholder 321 and the knob 335 lowered, thereby preventing vertical shifting of the card in the later stages of the notching operation. The carriage 303, if not already positioned in the rightmost position, as viewed in FIGURES 17 and 18, is returned thereto by gripping the tab 338 and urging it rightwardly until the carriage advances as far as it will go. When the carriage is returned, the tooth 401(1) on the bar 312 engages the tooth 430 on the wheel 426, thereby aligning character field 1 on the card 304 at the notching station. When so aligned, punches 361(a)–361(e) are aligned, respectively, with the five notch sites of character field 1 and character field 1 is now ready for notching.

The notching cycle is effected by energizing the various ones of the solenoids 307(a)–307(e), the particular solenoids energized depending on the particular notch sites to be notched, which in turn depends on the particular character key of the keyboard coder (not shown)

that is actuated. Energizing one or more of the solenoids 307(a)–307(e) by suitable keyboard coder means pivots one or more of the associated levers 381(a)–381(e) about the rod 390, causing one or more of the punches 361(a)–361(e) to slide, thereby notching the card 304. When the solenoids 307(a)–307(e) are de-energized, the punches 361(a)–361(e) are returned to the centered position by the springs 391. Upon completion of the notching of character field 1, the stepping solenoid 421 is sequentially energized and de-energized, pivoting the flap 415 and advancing the carriage one field until tooth 401(2) on the bar 312 abuts tooth 430 on the wheel 426. At this point, field 2 is at the notching station 305 and the first notching cycle completed. If notching is desired in field 2, the notching solenoids 307(a)–307(e) are again energized as desired to produce notching in the manner described. If no notching is desired in field 2, only the stepping solenoid 421 is energized and de-energized, advancing the carriage relative to the notching station 305 and aligning field 3 with the notching punches 361(a)–361(e). In a like manner, the remaining fields 4–13 of the card 304 are sequentially advanced through the notching station 305 in a field-by-field fashion affording the opportunity to notch one or more of the notch sites in each of the remaining fields and thereby completing the keying–notching operation. If duplicate cards are desired, the above procedure, including the keying operation, is repeated once for each card desired.

It is to be noted that all character fields 1–13 of a card need not be notched. If a field is notched, it may be notched at one or more notch sites depending on the code being used. In addition if two notch sites in a field are notched, as with a two out of five code, the notches may be made simultaneously or sequentially in any order, and may be adjacent or separated by one or more notch sites.

SEQUENTIAL KEYING AND PUNCHING DUPLICATING CODER

General description

The third embodiment of the invention, which provides duplicate edge notched cards with only a single keying operation, but which does not notch simultaneously with keying, is shown in FIGURES 24–44. Referring more particularly to FIGURE 24, the third embodiment includes a frame for supporting the various operating mechanisms of the coder having vertically disposed spaced parallel left-hand, central, and right-hand frame members 501, 502, and 503, respectively. Horizontally disposed front, upper rear, and lower rear bars 504, 505 and 506 respectively, are secured to corners of the frame members 501, 502 and 503, thereby maintaining the frame members fixed relative to each other.

In addition to the frame, the third embodiment of the invention includes a carriage 507 mounted for transverse sliding movement on a pair of horizontally disposed spaced parallel guide rods 508 and 509 which are supported at their approximate mid-points by the central frame member 502 and at their ends by the left-hand and right-hand frame members 501 and 503, respectively. Forming part of the carriage 507 and fixed relative thereto is a horizontally disposed card holder 510 which is adapted to receive a record 511. Also forming a part of the carriage 507 is a vertically disposed memory unit 512 having sixty-five settable memory fingers 555 arranged in thirteen equally spaced fields 1–13 each having five fingers a–e per field. The fingers 555(a)–555(e) of each field are horizontally staggered an amount equal to the width of a notch site. The memory fingers, as viewed in a vertical projection, form thirteen contiguous fields 1–13 having five contiguous bits or memory fingers 555(a)–555(e) per field. Since the fingers 555(a)–555(e) of each field are staggered an amount equal to the width of a notch site, the collective width of the sixty-five vertically projected fingers is equal to the collective width of the sixty-five notch sites located along the sorting edge 517 of the card 511.

A group of five memory finger setters 518(a)–518(e), of which only the setting hammers 519(a)–519(e) thereof are shown in FIGURE 24, are provided for simultaneously and selectively setting the memory fingers 555(a)–555(e) of the fields 1–13 in a field-by-field fashion as the memory unit 512 steps past the stationary memory finger setters.

The third embodiment of the invention further includes a mechanical sensing unit 520 having a group of five memory finger sensing arms 521(a)–521(e) whose free ends are vertically aligned and adapted to sequentially and mechanically sense set memory fingers 555(a)–555(e) as the carriage 507 translates leftwardly under the action of a biasing means 529 and flexible cable 530 (FIGURE 3), carrying with it the memory unit 512.

A card notching mechanism 522 having a cooperable rotating punch 523 and stationary die 524 is also provided. The location of the notching station is such that the notch sites located along the sorting edge 517 of the card 511 successively traverse the slot 525 formed in the die 524 in synchronism with successive traversals of the corresponding memory fingers 555 past the aligned free ends of the sensing levers 521(a)–521(e).

A carriage indexer 526 including a detent mechanism 527 movable with the carriage 507 and a toothed bar 528 journaled at its ends to the central frame member 502 and right-hand frame member 503 is provided to successively step the carriage 507 on a field-by-field basis.

In operation, a card 511 is inserted into the card holder 510 with the sorting edge 517 toward the rear or notching mechanism 522. Assuming that the memory unit 512 has been erased and the carriage 507 returned to the extreme rightmost position as shown in FIGURE 24, the carriage 507 is successively stepped in a field-by-field fashion successively bringing the fields 1–13 of memory fingers 555 in alignment with the setting hammers 519(a)–519(e) thereby permitting the memory finger setters 518(a)–518(e) to selectively set different ones of the memory fingers on a field-by-field basis in accordance with the character keys actuated. When the desired memory fingers 555 have been set, the keying operation is complete and the carriage 507 is returned to the rightmost position and the indexing mechanism 526 released, in a manner to be described, whereupon the carriage unit proceeds to translate leftwardly. As the carriage unit 507 translates leftwardly, the set memory fingers, which project from the rear surface of the memory unit 512, are successively sensed by the free ends of the sensing levers 521(a)–521(e). The successive sensing of the set memory fingers, in turn, causes successive energization of the rotating punch 523 thereby successively producing notches at the notch sites corresponding to the set memory fingers. When all the set memory fingers have been sensed, the notching operation is complete and the carriage 507 may be again returned to the rightmost position, a new record card inserted in the card holder 510, and the carriage released thereby repeating the sensing and notching operation producing a duplicate edge notched card. This process may be repeated as many times as desired to produce as many duplicate edge notched cards as required. When desired, the memory unit 512 may be erased, that is, the set memory fingers reset, during the carriage return in a manner to be described in greater detail later.

Detailed description

The carriage 507, as more particularly shown in FIGURES 24, 25 and 26, includes an upper pair of spaced guide blocks 535 and 536 each of which are provided with horizontally disposed journal bearings through which pass the lower guide rod 509. A flat sheet metal plate 539 forming part of the card holder 510 is secured to the upper surfaces of the guide blocks 535 and 536 by fasteners 540. A spring clamp 541 passing through an aperture 542 in the plate 539 has its forward end secured to the bottom surface of the forward edge of the plate 539 by fasteners 543. The rear end 544 of clamp 541 is slightly flared forming with the plate 539 a mouth into which a record card 511 may be easily inserted. Spaced parallel, lateral guide bars 545 and 546 and forward guide bars 547, 548 are secured to the upper surface of the plate 539 for aligning the left edge, right edge, and forward edge of the card, respectively, thereby insuring proper registration of the card 511 when inserted into the card holder 510. A portion of the bottom rear surface of the plate 539 seats on a reduced thickness portion 513 of the die 524 thereby rendering the upper surface of the plate 539 flush with the upper surface, slot-containing portion of the die. In operation, when a record card 511 is inserted into the record holder 510 and its forward end caused to abut the guide bars 547 and 548, the sorting edge 517 of the card 511 will be positioned adjacent the notching station permitting the contiguous notch sites of the card to successively traverse the slot 525 formed in the die 524 as the carriage 507 translates leftwardly.

Also forming a part of the carriage 507 and movable therewith is the memory unit 512. More specifically, the memory unit 512 is mounted at its upper edge to the bottom surfaces of the guide blocks 535 and 536 and at its lower edge to the upper surfaces of the guide blocks 537 and 538, as shown in FIGURES 25 and 27. Structurally, the memory unit 512 includes front and rear, vertically disposed, spaced parallel apertured plates 551 and 552, respectively. The spacing of the plates 551 and 552 is preferably maintained by shoulders 553 formed integral with the guide blocks 535–538. The apertures 554, which number sixty-five, correspond to the number of notch sites located along the sorting edge 517 of a record card 511 and are arranged in a skewed matrix configuration. More specifically, the apertures 554 are arranged in thirteen vertically disposed equally spaced columns corresponding to the thirteen character fields 1–13 and in five horizontal rows a–e corresponding to the five bits or notch sites in each character field. The apertures 554(a)–554(e) of each column are staggered in the horizontal direction an amount corresponding to the width of a notch site, successively lower apertures in each column being disposed leftwardly of the upper apertures in the column. The apertures 554(a)–554(e) of any column, as viewed in a vertical projection, are contiguous. Collectively, the apertures 554 of the thirteen columns 1–13, as viewed in a vertical projection, are also contiguous yielding sixty-five contiguous apertures arranged in thirteen contiguous fields 1–13 of five contiguous apertures a–e per field.

Slidably mounted in oppositely disposed pairs of apertures in the plates 551 and 552 are memory fingers 555, as shown more particularly in FIGURES 30, 31 and 43. The memory fingers 555, which are identical in construction, are generally elongated, having a rectangular cross-section. Fitted about the rearward portion of each memory finger 555 is a coil spring 556 which cooperates with a shoulder 567 to bias the memory finger forwardly. The maximum extent of forward memory finger motion under the action of the spring 556, as shown more particularly in FIGURE 43, is limited by the abutment of shoulders 550 and 558 formed on the upper and lower edges respectively, of the memory fingers 555 with the inner surface of the plate 551. With the shoulders 550 and 558 of the memory fingers abutting the plate 551, the memory fingers are in the reset position and the ends 557 are flush with the exterior surface of the plate 552.

The memory fingers 555(a)–555(e) of any field 1–13 in addition to passing through oppositely disposed pairs of apertures 554 also pass through apertures 559 formed in a locking strip 560 positioned parallel to and intermediate the plates 551 and 552. The locking strips 560, of which there are thirteen corresponding to the thirteen fields 1–13, are C-shaped, having a vertical center leg 561 joined at its extremities to horizontally extending upper and lower legs 562 and 563, respectively. The free ends of legs 562 and 563 abut the inside surface of the plate 552 urging the intermediate leg 561 against the interior surface of the plate 551. The locking strips 560, which are angularly disposed parallel to the line formed by the apertures 554 of the various fields 1–13, are vertically shiftable between an upper position and a lower position. When the locking strips 560 are in the upper position, as shown in FIGURE 43, the memory fingers 555 are in the reset position wherein the shoulders 550 and 558 abut the plate 551.

When the locking strips 560 are in the normal, lowered position, the beveled upper edges 564 of the apertures 559 are aligned with the upper shoulders 550 and shoulders 565. With the beveled edge 564 so aligned, the memory fingers 555 become positionably bi-stable in either the set or the reset position. Specifically, in the reset position which is exemplified, for example, by the uppermost pin shown in FIGURE 30, the ends are flush with the exterior of the plate 552, the shoulders 550 and 558 abut the inside surface of the plate 551, and the beveled edge 564 seats in the saw-tooth notch 566 located intermediate the shoulders 550 and 565. In the set condition, which is exemplified, for example, by the lowest memory finger 555 depicted in FIGURE 30, the memory finger 555 is shifted rearwardly with its end 557 projecting beyond the surface of the plate 552 and maintained in this position by the abutting relationship of the inside surface of the locking strip 560 and the shoulder 550.

In operation, the memory fingers 555 are reset by momentarily raising the locking strips 560 thereby removing the beveled edges 564 from alignment with the shoulders 550 and 565 and allowing the memory fingers 555 to move forwardly under the action of the springs 556 bringing the shoulders 550 and 558 into abutting relationship with the plate 551 and the shoulder 565 into abutting relationship with the lock strip section 561. After the memory fingers 555 have been reset, the locking strips 560 are lowered seating the beveled edges 564 in the saw-tooth notches 566. Setting of the memory fingers 555 is accomplished by urging the memory fingers 555 rearwardly which cams the locking strip 560 upward as the beveled edge 564 rides out of the saw tooth notch 566, bringing the shoulder 550 behind the rear surface of the intermediate leg 561 of the locking strip 560. As the notch 566 passes beyond the beveled edge 564, the locking strip 560 drops to its normal position to capture the finger in the set position. As mentioned earlier, the finger will remain in the set position until the locking strip 560 is raised during a reset operation.

Referring now to FIGURES 25 and 26, a group of memory finger setters 518(a)–518(e) are provided to collectively set the memory fingers 555 on a field-by-field basis as the carriage 507 steps leftwardly in a manner to be described later. The memory finger setters 518(a)–518(e) include five solenoids 570(a)–570(e). Also included, is a set of five finger setting hammers 519(a)–519(e) which are pivotally mounted about a vertically disposed rod 571 supported at its ends by a block 572. The block 572 has angularly disposed slots 573 through which pass the hammers 519(a)–519(e) and is mounted to a plate 574 secured to the upper front edge portions of the left and central frame members 501 and 502, respectively. The hammers 519(a)–519(e) are pivotally connected at their left end to the cores of solenoids 570(a)–570(e), respectively. A set of springs 575(a)–575(e) positioned about the cores of the solenoids 570(a)–570(e) normally urge the hammers 519(a)–

519(e) clockwise, as viewed in FIGURE 3, thereby spacing the free ends of the hammers from the field of oppositely disposed memory fingers 555(a)–555(e). Momentary energization of one or more of the solenoids 570(a)–570(e) retracts its associated core pivoting the associated hammer 519(a)–519(e) counterclockwise about the rod 571, as viewed in FIGURE 3, thereby urging one or more of the free ends of the hammers 519(a)–519(e) against one or more of the oppositely disposed memory fingers 555(a)–555(e), thereby setting the memory fingers.

As best shown in FIGURES 25 and 27, the carriage indexer 526 is provided for the purpose of indexing the memory unit 512 on a field-by-field basis thereby successively bringing the fields 1–13 of memory fingers 555(a)–555(e) into alignment with the free ends of the setting hammers 519(a)–519(e) and includes the toothed rod 528 and the detent mechanism 527. The toothed rod 528, which is rotatable about its axis, has its ends mounted in journal bearings formed in the central and right frame members 502 and 503. Integral with the rod 528 and disposed in a line parallel to its axis are thirteen teeth 576(1)–576(13), which are spaced at equal intervals corresponding to the width of a field of notch sites. The detent mechanism 527 includes a mounting block 577 having its rear surface secured to the front surface of the guide block 538 by suitable fasteners. Pivotally mounted at its lower left corner about a pin 578 secured to the lower left corner of the mounting block 577 is a flap 579 having formed on its lower right corner a depending tooth 580. Pivotally mounted at its upper left corner about a pin 581 secured to the upper left corner of the flap 579 is a flap 582 having formed on its lower right corner a depending tooth 583. A spring 584 is connected between a pin 585, which passes through slots in the flaps 582 and 579 and is secured to the mounting block 577, and a pin 586 secured to the upper right corner of the flap 579. The spring 584 biases the flap 582, directly, and the flap 579, via the pin 581, in a clockwise direction. When so biased the teeth 580 and 583 assume the position shown in FIGURE 4.

A stepping solenoid 601 secured to the central frame member 502, in conjunction with the detent mechanism 527 and the tooth bar 528, produces the indexing motion of the carriage 507. The solenoid 601 has its core 602 connected to the rear end of a lever 603. The lever 603 at its forward end, in turn, is connected to the upper end of a lever 604 which is mounted for rotational movement with the rod 528. The lever 603 is biased forwardly by a spring 605 connected between the solenoid core 602 and the central frame member 502, rotating the lever 604 to the vertical position. With the lever 604 in the vertical position the teeth 576(1)–576(13) of the toothed bar 528 are vertically disposed and in alignment with the tooth 583 on the flap 582. Depending on the exact position of the carriage 507, with the teeth 576(1)–576(13) vertically disposed, the carriage motion will be arrested by the engagement of the tooth 583 with one of the teeth 576(1)–576(13), as shown in FIGURE 2.

To step the carriage 507 leftwardly the distance of one field to the next succeeding tooth 576, the solenoid 601 is energized retracting the core 602 and lever 603 pivoting the lever 604 counterclockwise as viewed in FIGURES 25, 27 and 28. The pivoting of lever 604 in turn rotates the toothed rod 528 counterclockwise shifting the tooth 576 from engagement with the tooth 583 to engagement with the tooth 580. When the tooth 576 has fully shifted to engagement with the tooth 580, the tooth 583 is no longer restrained from moving counterclockwise, as viewed in FIGURE 27, under the action of the spring 584, and consequently does rotate in this direction advancing the tooth 583 leftwardly relative to the engaged teeth 580 and 576. Up to this point the carriage 507 has remained stationary. However, when the solenoid 601 is de-energized and the core 602 and lever 603 return to their normal forward position under the action of the spring 605, the lever 604 and teeth 576(1)–576(13) rotate clockwise moving the toothed bar 528 forwardly out of engagement with the tooth 580. This forward motion aligns the toothed bar 528 with the tooth 583, in addition to disengaging a tooth 576 and the tooth 580. With the tooth 583 aligned with a tooth 576, the carriage 507 will index leftwardly one field under the action of a biasing tension means 629 acting through a cable 630 connected to the carriage 507 whereupon the tooth 583 engages the next succeeding tooth 576 stopping the carriage motion at the next field. Successive momentary energization of the solenoid 601 will, in a similar manner, successively step the carriage one field at a time.

To return the carriage to the rightmost position, the flaps 579 and 582 are selectively pivoted counterclockwise by a linkage mechanism including a lever 587 pivotally mounted at its midpoint about a pin 588 which is secured to the guide block 536 and pinned at its lower end to a lever 589. The lever 589 is provided at its lower end with a stepped slot 590 through which the pin 586 passes. The teeth 580 and 583 may be selectively raised above the teeth 576(1)–576(13) by urging the free end of the lever 587 rightwardly pivoting the lever 587 about the pin 588, thereby raising the lever 589 and positioning the pin 586 in abutting relationship with the bottom of the left portion of the slot 590 whereupon further rotation of the lever 587 raises the lever 589 and the pin 585 causing the flaps 577 and 582 to pivot counterclockwise. If further force is applied to the free end of the lever 587 in an attempt to pivot the lever counterclockwise about the pin 588, the entire carriage 507 will move rightwardly. This rightward motion of the carriage 507 continues until the guide blocks 536 and 538 abut the right frame member 503. When the carriage 507 reaches a point just short of the rightmost extent of travel, a stop member 591 extending horizontally and leftwardly from the inside surface of the right frame member 503 abuts a notch 592 in the lever 589, pivoting the lever clockwise about its upper pinned end causing the pin 586 to unseat from the bottom of the left portion of the slot 590 and seat on the bottom of the rightmost portion of the slot 590. As a result of the pin 586 having seated in the bottom of the rightmost portion of the slot 586, which is lower than the bottom of the leftmost portion of the slot 586, the flaps 579 and 582 will pivot clockwise lowering the teeth 580 and 583 into possible abutting relationships with the teeth 576(1)–576(13) of the toothed bar as pressure is relieved on the free end of the lever 587, at an earlier instant with respect to the counterclockwise motion of the lever 587 about the pin 588 than would occur if the pin 586 had remained seated in the bottom of the leftmost portion of the slot 590.

The mechanical sensing unit 520 includes a set of five stacked L-shaped, horizontally disposed sensing levers 521(a)–521(e) having their free ends vertically aligned and spaced at distances equal to the vertical spacing of the memory fingers 555(a)–555(e). As can best be seen in FIGURES 24, 26, 38, 40 and 44, the sensing levers 521(a)–521(e) at their other end are mounted for pivotal motion about a vertically disposed pin 610 which is secured at its upper end to a horizontally disposed arm 611 of a casting 609, and at its lower end to another horizontally disposed arm 612. The sensing levers are biased for pivotal motion in a clockwise direction, as viewed in FIGURE 24, by a set of associated leaf springs 613(a)–613(e). This biasing is effective to urge the free ends of the mechanical sensing levers 521(a)–521(e) against the rear surface of the plate 552. The pinned ends of the levers 521(a)–521(e) are rounded as shown more particularly in FIGURE 44 and fitted into vertically spaced, horizontally disposed slots 614(a)–614(e) formed in a member 615. The member 615 which is also mounted for pivotal motion about the pin 610 has a rightwardly extending portion 616 which, when the member 615 is rotated counterclockwise, abuts the levers 521(a)–521(e) at a point adjacent their pinned ends pivoting the levers 521(a)–521(e) counterclockwise thereby retracting the free ends of the levers from against the rear surface of the plate 552.

The casting 609 and its associated arms 611, 612 integral therewith are mounted for pivotal motion about a vertically disposed pin 617 which is secured at its lower end to a stationary horizontal support member 618. The casting 609 is biased in a clockwise direction by a spring 619 connected between the arm 611 and a stationary support member 620 (FIGURE 26). The extent of motion of the arm 611 and hence of casting 609 in the counterclockwise direction is limited by an adjustable stop member 621 mounted to a stationary vertical support 622 and in the counterclockwise direction is limited by an adjustable stop member 623 secured to a stationary vertical support 624 which abuts a vertically extending portion 625 of the casting 609.

As mentioned earlier, the notching station 522 includes a die 524 mounted to the central frame member 502 and having a slot 525 formed in its rear edge, as shown in FIGURES 24–26 and 41. Operatively associated with the die 524 is a wheel 630 having the radially projecting punch 523 formed on its periphery which passes through the slot 525 as the wheel 630 rotates, thereby notching a notch site positioned over the notch 525. The wheel 630 is mounted for rotation about the end of a shaft 631 which is supported at its right end by a stationary journal block 632, at its intermediate portions by a stationary journal block 633 and a journal fitted into the central frame member 502, and at its left end by a journal fitted into the left frame member 501. The stationary journal blocks 632 and 633, in conjunction with spacers 634 and 635, maintain the proper axial relationship between the wheel 630 and the shaft 631 thereby maintaining the alignment of the punch 523 and the slot 525 of die 524.

A drive assembly as shown in FIGURES 24, 26 and 38, including a motor 640 having an output shaft 641 is provided to power the rotating punch 523. Securely fixed to the left end of the shaft 641 is a disc 642 having a plurality of equally circumferentially spaced apertures 643 therein. Oppositely disposed from the disc 642 is a disc 644 having an axially disposed pin 645 (FIGURE 26) mounted on its right face at a radial distance corresponding to that of the circumferentially spaced apertures 643 formed in the disc 642. The disc 644 is biased against the disc 641 by an axially disposed coil spring 646. The spring 646 has its one end connected to the left face of the disc 644 and its other end connected to a disc 647 which is fixed to a shaft 648 via a collar 649 formed integral with the disc 647 and keyed to the shaft 648. The shaft 648 passes through the center of the spring 647 and through oversized axial bores (not shown) formed in the discs 644 and 642, and is supported at its extremity by an axially disposed journal bearing (not shown) fitted into the end of the shaft 641.

The clutch 650 comprising the discs 642 and 644 is engaged when the mating adjacent surfaces of the discs 642 and 644 are in face-to-face contact, as shown in FIGURE 38. In this condition the pin 645 engages one of the apertures 643 thereby establishing a driving connection between the discs 642 and 644 and between the shafts 648 and 641 to which the discs 647 and 644 are connected, respectively. With the clutch 650 so engaged the driven motor 640 will rotate the shaft 641 and hence the engaged discs 642 and 644 in the direction of the arrow 651 (FIGURE 38). The clutch 650 is disengaged when the mating adjacent surfaces of the discs 642 and 644 are not in face-to-face contact, but rather are angled as shown in FIGURES 26 and 40. When so angled, the pin 645 is disengaged from the apertured disc 642 preventing the establishment of a driving connection between the discs 642 and 644.

The clutch 650 is caused to become disengaged by angling the disc 640 relative to the disc 642, thereby retracting the pin 645 from aperture 643 in which it previously was engaged. To angle the disc 644 thereby disengaging the clutch 650, a cam surface 652 forming part of a notch 655 in the extremity of the longer leg 653 of the casting 609 is positioned in the path of a radially extending pin 654 secured to the periphery of the disc 644, as shown more particularly in FIGURES 26 and 40. When the cam surface 652 is so positioned the rotating disc 644 drives the pin 654 downwardly in the notch 655. This downward motion of the pin 654 in the notch 655 causes the pin to be cammed rightwardly as viewed in FIGURE 40 (leftwardly as viewed in FIGURE 26), angling the disc 644 away from the disc 642, withdrawing the pin 645 from the aperture 643 in the disc 642, thereby disengaging the clutch 650. To engage the clutch, the casting 609 is pivoted clockwise about the pin 617, during the sensing cycle described in detail below, to swing the free end of the leg 653 forwardly, allowing the cam follower pin 654 to leave the notch 655. When the cam follower pin 644 is no longer engaged with the notch 655 the spring 647 returns the disc 644 to a face-to-face contact condition with the disc 642, allowing the drive pin 645 to engage one of the apertures 643, thereby establishing a driving connection between the discs 644 and 642 and the shafts 648 and 641 to which the discs 644 and 642 are respectively connected.

In operation, the clockwise pivotal motion of the casting 609 necessary to swing the leg 653 to disengage the clutch 650 is produced when one of the sensing levers 521(a)–521(e) senses a rearwardly projecting set memory finger 555(a)–555(e). More specifically, the necessary pivotal motion for engaging the clutch is produced when one of the sensing levers 521(a)–521(e) which, as indicated earlier, are urged by the springs 613(a)–613(e) against the rear surface of the plate 552, abuts a projecting set memory finger 555. When this occurs, the sensed memory finger 555, under the action of the spring bias tension device 629 and cable 630, drives the memory finger 521 leftwardly, pivoting the casting 609 about the pin 617 to the extent limited by the stop member 621, swinging the notched end of the leg 653 away from the cam follower pin 654 thereby engaging the clutch in the manner described previously. The clutch 650, once engaged, will drive the shaft 648 through one revolution whereupon the lobe 658 formed on the periphery of a cam 659 mounted for rotation with the shaft 648 abuts an angulated arm 660, rigidly affixed to the member 615, to pivot the free end of the arm forwardly about the pivot 610 and thus pivot the member 615. When the member 615 pivots about the end 610 the extension 616 pivots counterclockwise swinging the free ends of the sense levers 521(a)–521(e) rearwardly thereby disengaging them from the sensed projecting set memory finger 655. When the sensing lever 521 has become disengaged from the memory finger 555 the levers 521 are no longer urged leftwardly and consequently the casting 609 pivots counterclockwise positioning the notched end of the leg 653 in the path of the cam follower pin 654. With the notched end of the leg 653 so positioned the cam follower pin will be cammed by the cam surface 652 angling the disc 644 and disengaging the clutch 650. As the clutch 650 is disengaging, the cam 659 coasts to a stop bringing the lobe 658 out from beneath the free end of the arm 660, allowing the arm 660 to pivot clockwise, which in turn pivots the member 615 clockwise. With the member 615 pivoted clockwise the sensing levers 521 are free to once again be urged into contact with the back surface of the plate 552 ready for the sensing of the next successive projecting set memory pin 555, which advanced to the sensing station under the action of the spring biasing means 629 upon the disengagement of the sensing lever 521 and the previously sensed set memory finger 555.

A drive chain 665 trained over sprockets 666 and 667 which are mounted for rotation with the shafts 631 and 648, respectively, is provided to transmit driving motion from the motor 640 through the engaged clutch 650 to the rotating punch 523, as shown in FIGURES 24 and 41. The clutch 650 is engaged for only a single revolution, the rotation of the cam 659 being effective to disengage the clutch 650 after a single rotation, in the manner described earlier. Therefore, the rotating punch 523 is driven through only a single revolution for each set memory finger sensed, producing only a single notch at any given notch site.

The operation of the motor 640 is controlled by a switch 606 shown in FIGURES 27 and 29. The switch 606 has an angulated actuating arm 607 pivotally connected thereto at its left end. With the arm 607 in the upper position as shown in FIGURE 27, the switch 606 is closed and the motor 640 is running; with the arm 607 in the lower position as shown in FIGURE 27, the switch 606 is open and the motor 640 is not running. The operation of the actuating arm 607 of the switch 606 is controlled by a horizontally disposed rod 608 mounted for limited lateral shifting motion under the action of a tripping yoke 626 carried by the carriage 507 which engages a collar 627 fixed to the rod 608. The relative positions of the yoke 626 and collar 627 are such that when the carriage 507 approaches its leftmost limit of travel (FIGURE 29), the rod 608 is shifted leftwardly by the engagement of the yoke and collar. This leftward shifting of the rod positions holding notch 629 within an aperture in a bracket 636 and cams a roller 628 fixed to the free end of the arm 607 downwardly to thereby break the circuit to the motor 640.

The circuit to the motor 640 will remain broken until the carriage 507 has been withdrawn to its rightmost position. To this end, a shoulder 638 (FIGURE 25) on the right end of the shaft 608 is provided which, as the carriage moves rightwardly, is engaged by the yoke, shifting the shaft rightwardly to thereby disengage the notch 629 and the aperture in the bracket 636. Because of the relative location of the shoulder 638 and the yoke 626, the circuit to the motor will remain broken until the carriage is in its rightmost position. Shifting of the shaft 608 to the right permits the roller 628 and arm 607 to raise and complete the circuit to the motor 630 via the switch 606. Another notch 639 of the rod 608 is now positioned within the aperture of the bracket 636 to hold the rod 608 in its rightmost position until the yoke 626 engages the collar 627 as described above.

As indicated previously, to erase the memory unit 512 and thereby reset the memory fingers 555 the locking strips 560 are momentarily shifted upwardly disengaging the beveled edges 564 and the notches 566 thereby permitting the springs 556 to urge the memory fingers 555 forwardly to the next position. To momentarily shift the locking strips 560 upwardly, an erasing mechanism 668 is provided as shown in FIGURES 24, 32–37 and 42. The erasing unit comprises a horizontally extending rod 669 having a flattened free end 670 positioned beneath the lower edge of the memory unit 512. The rod 669 is connected at its other end to a horizontally extending lever 671. The lever 671 has an increased thickness midsection 674 which is pivotally mounted about a horizontal pin 672 secured at its ends to the upstanding arms of a stationary yoke 673. The end 675 of the lever 671 to which the rod 669 is attached is biased downwardly by a spring 676 pivoting the lever 671 counterclockwise about the pin 672. The increased thickness portion 674 of the lever 671 has a vertically disposed bore through which passes a stationary pin 677 secured at its lower end to the yoke 673. The other end of the lever 671 is biased in a counterclockwise direction about the pin 677 by a leaf spring 678 secured at its one end to the pin 677 and at its other end to the other arm 679 extending rightwardly from the increased thickness portion 674 of the lever 671. The extremity of the arm 679 is biased into a stepped depth notch 680 having a shallow depth portion 681 and a deep portion 682.

Also included in the erasing mechanism is a vertically disposed lever 683 which rides in slots formed in horizontal stationary guides 684 and 685. The guides 684 and 685 are supported by angulated supports 663 and 664 secured at their lower ends to the central frame member 502 and the right frame member 503, respectively. The lever 683 is biased upwardly by a coil spring 686 fitted about the lever and connected between a disc 687 secured to the lever 683 and the upper surface of the lower guide member 685. A pair of notches 688 and 689 are formed in the forward edge of the lever 683 and adapted to engage the end 690 of a detent 691 pivotally mounted about a pin 692 secured to the lower guide frame 685. The detent 691 is biased into the notches 688, 689 or in a counterclockwise direction, as viewed in FIGURES 32–34, by a spring 693 connected between the end 690 of the detent 691 and the rearward edge of the guide frame 685. A button 694 fitted to the upper end of the lever 683 is provided to enable the lever 683 to be depressed to erase the memory unit when resetting the memory fingers is desired.

The lever 683 has formed in its lower end an elongated vertically disposed slot 701 in which lies a pin 702 formed in one end of a lever 703. The lever 703 is pivotally mounted at its midpoint about a pin 704 secured to a stationary support block 705 and pinned at its other end 706 to a link 707. The link 707 at its non-pinned end is fixed to the end of the toothed rod 528.

A vertically disposed lever 695 is also slidably positioned in a pair of slots formed in the upper and lower guide members 684 and 685, respectively. Like the lever 683, the lever 695 is also fitted at its upper end with a button 696 and biased upwardly by a spring 697 positioned between a disc 698 secured to the level 695 and the upper surface of the lower guide member 685. The level 695 is provided with a pair of notches 699 and 711 which are selectively engageable with the end 700 of the detent 691.

During the notching operation, the button 696 is depressed and the elements of the erasing mechanism 668 assume the positions shown in FIGURE 33. Specifically, during the notching operation, the lever 695 is maintained in the lowered position by the engagement of the end 700 of detent 691 and the notch 699, and the lever 683 is maintained in the raised position by the engagement of the end 690 of detent 691 and the notch 689. In addition, the lever 671 is pivoted counterclockwise about the pin 672 as a consequence of the end 679 being engaged in the lowermost, deeper notch 682 formed in the lever 683, which is positioned in its uppermost position as indicated previously. With the lever 671 rotated counterclockwise the rod 669 is in its lowermost position and in this position is out of engagement with the lower legs 563 of the locking strips 560, as shown more particularly in FIGURE 30. Since the rod 669 is in its lowermost position, the memory unit 512 is free to traverse the rod 669 without producing any vertical shifting of the lock strips 560 to thereby erase the memory unit 512 and reset the memory fingers 555.

When it is desired to erase the memory unit 512 at the end of a notching operation, the button 694 is depressed and the carriage 507 returned to the rightmost position. As the button 694 is depressed, the elements comprising the erasing mechanism 668 shift from the positions shown in FIGURE 33 to the positions shown in FIGURE 34. The lowering of the lever 683 cams the detent 691 clockwise as it slides on the angled upper edge 710 of the lower notch 689. The clockwise rotation of the detent 691 about the pin 692 disengages the end 700 from the notch 699 allowing the lever 695 to move upwardly under the action of the spring 697, facilitating the engagement of the notch 711 with the end 700 of the detent 691. Concurrently with the switching of the end 700 of the detent 691 from the notch 699 to the notch 711, the end 690 of the detent 691 switches engagement from the notch 689 to the notch 688. Simultaneously, with the reciprocal concurrent movement of the levers 683 and 695, the end 679 of the lever 671, which is captured in the deep notch 682, is forced downward, pivoting the lever 671 about the pin 672 and thereby raising the rod 669, bringing the flattened portion 670 of the rod in alignment with the protruding legs 563 of the locking strips 560, as shown more particularly in FIGURES 42 and 43. The depressing of the lever 683 has had still a further consequence, namely, it has pivoted the link 703 clockwise (from the position shown in FIGURE 36 to that of FIGURE 35), pivoting the link 707 and thereby aligning the teeth 576(1)–576(13) in alignment with the tooth 580 of the detent mechanism.

With the mechanism 688 readied for memory erasing by the depression of the lever 683, erasing of the memory unit 512 is effected by returning the carriage 507 to the rightmost position in the manner described previously. As the carriage 507 is returned to the rightmost position, the flat portion 670 of the rod 669 sequentially and momentarily raises the locking strips 560, resetting the set memory fingers 555 in a field-by-field fashion in the manner described previously.

Concurrently with the return of the carriage 507 to the rightmost position the lower left guide block 537 abuts the end 670 of the rod 669 pivoting the lever 671 in the direction of the arrow 715 (FIGURE 34) about the pin 677 and disengaging the end of the lever 679 from the deep portion 682 of the slot 680. With the end 679 of the lever 671 disengaged, the end 679 rises to the position shown in FIGURE 32 under the force of tension spring 676, pivoting the lever 671 about the pin 672 and lowering the end 670 of the rod 669. With the flat end 670 of the rod 669 in its lower position the erasing mechanism is disabled and traversal of the memory unit 512 relative to the end 670 of the rod 669 will not be effective to momentarily raise the lock strips 560 and thereby erase the memory unit 512.

With the elements of the erasing mechanism 668 in the positions shown in FIGURE 32, the machine is readied for keying-in the desired characters which is accomplished by indexing the memory unit in a field-by-field fashion past the selectively actuable memory finger setters 518(a)–518(e). Upon completion of the keying-in operation, the lever 695 is depressed and locks in the depressed position by the engagement of the end 700 in the notch 699. The depression of the lever 695 pivots the detent 691 clockwise about the pin 692 under the camming action of the beveled upper edge 709 of slot 711. As the detent 691 pivots clockwise, the lever 683 is released, and the end 690 shifts from notch 688 to the notch 689. The upward motion of the lever 683 allows the link 703 to pivot clockwise which in turn pivots the toothed bar 528 counterclockwise moving the teeth 576(1)–576(13) out of alignment with the teeth 580 and 583 of the detent mechanism thereby disabling the indexer 526. With the indexer 526 disabled the carriage is returned to the rightmost position and released whereupon the carriage is urged leftwardly under the action of the spring biasing means 629. As the carriage moves leftwardly, the projecting set memory fingers 555 are sequentially sensed, and the rotating punch 523 sequentially actuated, notching the card 511 in accordance with the character keys activated.

Operation

In the description of the machine operation which follows, it will be assumed that the carriage 507 is in the leftmost position with the memory unit 512 in the unerased condition. To produce an edge notched card bearing a different code than that presently stored in the memory unit 512, the memory unit 512 is erased by depressing the button 694, which urges the flat end 670 of the rod 669 against the lower edge of the memory unit, and returning the carriage to the rightmost position, by urging the free end of the lever 587 rightwardly. Upon reaching the rightmost position, pressure on the lever 587 is released enabling the the detent mechanism 527 to engage the rightmost tooth 576(1) thereby positioning the first field of memory fingers 555(1)(a)–555(1)(e) opposite the finger setting hammers 519(a)–519(e). The positioning of the carriage 507 in the rightmost position has also been effective to disable the erasing mechanism 668 as a consequence of the guide block 537 having abutted the end 670 of the rod 669.

With the first field of memory fingers 555(1)(a)–555(1)(e) aligned with the hammers 519(a)–519(e), the desired fingers in the first field are set by momentarily actuating the appropriate solenoids 570(a)–570(e), pivoting the associated hammers 519(a)–519(e), and thereby setting the desired memory fingers of the first field. At this point the protruding set fingers of field 1 are positioned slightly downstream of the free ends of the sensing levers 521(a)–521(e) and therefore are not sensed by the sensing levers 521(a)–521(e) as the memory unit 512 is stepped one field to align field 2 with the setting hammers 519(a)–519(e). This downstream location of the fingers 555 with respect to the sensing levers 521 is accomplished by the location of the tooth 576(1) relative to the fingers 555(1).

Having set the memory fingers in the first field, the carriage unit is advanced one field by energizing momentarily the solenoid 601 which momentarily rotates the toothed bar 528 allowing the detent mechanism 527 to engage the tooth 576(1) thereby aligning the memory fingers 555(2)(a)–555(2)(e) opposite the setting hammer 519(a)–519(e). The desired memory fingers of the second field are then set by selectively actuating the appropriate solenoids 570(a)–570(e) in a manner similar to that done in setting the memory fingers of the first field.

The memory fingers of the remaining fields 3–13 are similarly set by sequentially, momentarily energizing the stepping solenoid 601 to successively align the fields 3–13 of memory fingers 555 opposite the setting hammers 519(a)–519(e) and, as the fields of the fingers become successively aligned with the hammers 519(a)–519(e), actuating the appropriate solenoids 570(a)–570(e) to thereby set the desired fingers in each of remaining fields.

Having set all of the desired memory fingers, the carriage 507 is now returned to the rightmost position by applying force to the free end of the lever 587, and a record card 551 inserted in the record holder 510 if one has not previously been inserted. When the record card is properly registered in the card holder 510, the return lever 587 is released and the carriage 507 is urged leftwardly under the action of the spring biasing means 529. The carriage 507 will advance leftwardly until the sensing unit 520 senses the first set memory finger whereupon the carriage stops and the rotating punch 523 notches the notch site in the record 511 corresponding to the sensed memory finger. Following this notching cycle, the carriage 507 is released and advances leftwardly until the next set memory finger is sensed by the sensing finger 520. When this occurs the carriage again stops and the notching punch 523 is again actuated. Upon completion of the second notching cycle, the carriage is released and proceeds leftwardly stopping upon sensing of the next set memory finger, notching the appropriate notch site corresponding thereto. This sequence of set finger sensing, carriage stopping, and site notching continues until all the set memory fingers have been sensed and all the corresponding notch sites have been notched.

For example, assume that the following six memory fingers were set in accordance with a two out of five code;

555(1)(a), 555(1)(b), 555(2)(c), 555(2)(e), 555-(13)(a) and 555(13)(d). Upon release of the carriage 507 from the rightmost position, the carriage would advance leftwardly until sensing lever 521(a) abutted set memory finger 555(1)(a) whereupon the carriage would come to rest after slightly shifting the sensing lever 521(a) leftwardly pivoting the casting 609 about the pin 617 which in turn moves the free end 653 of the L-shaped member forwardly disengaging the cam follower pin 654 from the notch 655. Upon disengagement of the notch 655 and the cam follower pin 654, the rotating disc 642 will become engaged with the disc 644 via the drive pin 645, rotating the punch 523 through one revolution via shaft 648, drive chain 666 and shaft 631 thereby notching the notch site corresponding to set memory finger 555(1)(a). When the shaft 648 has completed one revolution, the lobe 658 on the cam 659 trips the rod 660 pivoting the member 615 counterclockwise which, in turn, pivots the sensing levers 521(a)–521(e) counterclockwise thereby disengaging the lever 521(a) and the set memory finger 555(1)(a).

With the memory finger 555(1)(a) and the lever 521(a) disengaged the carriage moves leftwardly under the action of the spring until the set memory finger 555(1)(b) abuts the lever 521(b), the levers 521(a)–521(e) having been returned to their normal sensing position immediately after the disengagement of the set memory finger 555(1)(a) and the lever 521(a) by their respective springs 613(a)–613(e). The sensing of the memory finger 555(1)(b) again engages the clutch 650 for a revolution notching the notch site in the record site corresponding to the set and sensed finger 555(1)(b), and thereafter disengaging the member finger 555(1)(b) and the lever 521(b) thereby releasing the carriage and allowing it to translate leftwardly until the next successive set memory finger 555(2)(c) which abuts the lever 521(c). When this occurs, the carriage stops and the rotating punch 523 is driven through a cycle of one revolution to notch the notch site in the record card corresponding to the set memory finger 555(2)(c), the lever 521(c) and the set memory finger 555(2)(c) become disengaged and the carriage 507 translates leftwardly until the memory finger 555(2)(e) abuts the lever 521(e). When this occurs the carriage stops and the rotating punch 523 is driven through a cycle of one revolution notching the notch site of the record car corresponding to the sensed set memory finger 555(2)(e). Following the notching of the site corresponding to set finger 555(2)(e) the lever 521(e) and finger 555(2)(e) become disengaged and the carriage 507 translates uninterrupted until the set finger 555(13)(a) abuts the lever 521(a). When this occurs the carriage 507 stops and the rotating punch 523 is driven through a cycle of one revolution notching the site corresponding to finger 555(13)(a), whereupon the lever 521(a) and finger 555(13)(a) become disengaged and the carriage again translates leftwardly until lever 521(d) abuts set finger 555(13)(d). When this occurs the punch 523 is driven through a cycle producing a notch at the site corresponding to sensed finger 555(13)(d). When the notching cycle has been completed, the lever 521(d) becomes disengaged from the sensed memory finger 555(13)(d) and the carriage moves leftwardly stopping when the guide blocks 535 and 537 abut the inside surface of the left frame member 501, marking the end of the notching cycle and cutting off the motor 640.

It is to be noted that the carriage 507 does not stop at every field during the notching operation, but like the carriage of the machine of the first described embodiment, only stops where a memory finger has been set. Thus, the notching operation time is minimized.

If a duplicate record card is desired, upon removal of the previously edge coded record an unnotched card is inserted in the record card holder 510 and the carriage returned to the rightmost position whereupon it is released and the sensing and notching sequence described in the preceding paragraphs is repeated. When the desired number of duplicate cards have been produced by this method, the memory unit is erased in the manner described, and the carrige returned to the rightmost position readying the memory unit for keying in and storage of the next set of characters to be notched.

We claim:

1. A method of selectively notching fields of notch sites located along the edge of a record in accordance with a predetermined code comprising the steps of:
   positioning said record edge in site notching disposition relative to a sole site notching punch selectively operable in response to code inputs identifiable with specified different ones of said sites;
   producing relative indexing and shifting motion between said successive sites of said record edge on a sequential basis and said sole punch; and
   feeding said sole code inputs identifiable with said sites to said sole punch in synchronism with said relative motion thereby selectively actuating said punch and notching said sites in accordance with said code inputs.

2. The method of claim 1 further including the step of:
   actuating keys of a keyboard coding unit thereby generating said code inputs.

3. Apparatus for selectively notching fields of notch sites located along the edge of a record in accordance with a predetermined code comprising:
   a record holder,
   a sole site notching punch positioned in notching disposition with respect to said edge of a record held by said record holder and selectively actuable in response to code inputs; and
   an indexer interconnecting and shifting said record holder and said record edge notching punch in relatively movable record indexing and shifting relationship, thereby enabling said notching punch to selectively notch successive said notch sites on a sequential basis in accordance with said code inputs as said indexer effects relative indexing and shifting movement between said notching punch and said record holder.

4. The apparatus of claim 3 wherein said site notching punch includes a notching punch actuator connected to said notching punch in punch actuating relationship and selectively operable in response to said code inputs thereby actuating said punch and producing notches at selected ones of said notch sites in accordance with said code inputs as said indexer effects relative indexing and shifting movement between said notching punch and said record holder.

5. The apparatus of claim 4 wherein said indexer includes a toothed bar and a detent, one of said bar and detent being fixed relative to said punch and the other of said bar and detent being fixed relative to said holder, said bar and detent cooperating and effecting said relative indexing and shifting movement by sequential engagement of said detent and different ones of said teeth.

6. The apparatus of claim 5 wherein said sequential engagement is effected by reciprocating transverse relative movement between said detent and said toothed bar.

7. Apparatus for selectively notching fields of notch sites located along the edge of a record in accordance with a predetermined code comprising:
   a record holder;
   a selectively actuable site notching punch positioned in notching disposition with respect to said edge of a record held by said record holder;
   a memory unit having storage elements corresponding in number to said notch sites;
   a storage element code entry unit operatively associated with said memory unit in storage element code entering relationship and responsive to code inputs to enter said code inputs into said storage elements;

a storage element sensing and punch actuating unit in storage element sensing relationship with said storage elements and operatively associated with said punch to actuate said punch in response to sensed code inputs; and an indexer interconnecting and shifting said record holder and said punch in relatively movable indexing and shifting relationship, thereby enabling said punch to selectively notch said edge in accordance with said sensed code inputs as said indexer effects relative indexing and shifting movement between said punch and said record holder.

8. The apparatus of claim 7 wherein said storage elements are bistable having a set and reset state and wherein said storage element entry unit and said memory unit are movable relative to each other, and wherein said indexer also interconnects and shifts said memory unit and storage element entry unit.

9. The apparatus of claim 8 wherein said storage elements are grouped in fields corresponding to said fields of notch sites and wherein said relative indexing and shifting movement is in increments corresponding to one of said fields and wherein said storage element code entry unit includes a plurality of independently operable storage element code entry devices corresponding in number to said notch sites of one of said fields and wherein said storage element entry devices operate concurrently entering said code inputs into said fields of storage elements on a field-by-field basis in synchronism with said field increment indexing and shifting movement.

10. The apparatus of claim 9 further including a console having a plurality of code keys, each of said keys being connected to at least two of said storage element code entry devices, said keys each being operative upon actuation to set the storage elements of a given one of said fields, the particular field being dependent upon the relative position of said memory unit and said storage element code entry unit, in accordance with said code inputs corresponding to the particular one of said keys actuated, thereby enabling said fields of notch sites corresponding to said fields of storage elements to be sequentially notched in accordance with the code key actuated in each field.

11. Apparatus for selectively notching fields of notch sites located along the edge of a record in accordance with a predetermined code comprising:

a record holder;

a sale site notching punch selectively actuable in response to code inputs, said site notching punch being mounted in site notching relationship with said record edge thereby notching a notch site properly with said punch in response to a code input; and an indexer interconnecting and shifting said record holder and said punch in relatively movable record indexing and shifting relationship, thereby enabling said notching punch to selectively notch said edge in accordance with said code inputs as said indexer effects relative indexing and shifting movement between said punch and said record holder.

12. Apparatus for selectively notching fields of notch sites located along the edge of a record in accordance with a predetermined code comprising:

a record holder;

a site notching punch selectively actuable in response to code inputs, said site notching punch being mounted in site notching relationship with said record edge, thereby notching a notch site properly registered with said punch in response to a code input;

an indexer interconnecting and shifting said record holder and said punch in relatively movable record indexing and shifting relationship, thereby enabling said notching punch to selectively notch said edge in accordance with said code input as said indexer effects relative indexing and shifting movement between said punch and said record holder, said indexer including an array of fields of memory fingers fixed to said record holder, said memory fingers corresponding in number to the number of said notch sites and selectively shiftable in response to code inputs between a set position and a reset position, said indexing mechanism further including a memory finger sensing and punch actuating unit fixed relative to said punch and actuable in response to the sequential sensing of set memory fingers occurring as said relative indexing and shifting movement is effected, thereby selectively notching the notch sites of said record edge in accordance with said set memory fingers.

13. The apparatus of claim 12 further including a finger support and wherein said fingers are elongated and spaced at intervals equal to the width of said notch site and independently and slidably mounted in parallel juxtaposed relationship in said finger support.

14. The apparatus of claim 13 wherein said support includes first and second finger positioners each having a row of finger positioning slots having individual slot widths and slot spacings equal to the width of said notch site, said positioners being fixedly mounted relative to each other with said rows parallel and the slots and spaces of said first positioner aligned with the spaces and slots of said second positioner, respectively.

15. The apparatus of claim 13 wherein said indexer further includes a toothed bar having teeth corresponding to said fields and having a detent, one of said bar and detent being fixed relative to said record holder and selectively engageable with the other of said bar and detent, thereby enabling selective setting of said memory fingers as relative field-by-field indexing and shifting motion is effected by the engagement of said detent and successive ones of said teeth.

16. The apparatus of claim 13 wherein said indexer further includes a toothed bar having teeth corresponding to said fields and having a detent, one of said bar and detent being fixed relative ot said record holder and selectively engageable with the other of said bar and detent, thereby enabling selective setting of said memory fingers as relative field-by-field indexing and shifting motion is effected by the engagement of said detent and successive ones of said teeth, and wherein said memory finger sensing and punch actuating unit includes a helical cam movably mounted in alignment with said set fingers and successively shiftable by limited abutment with successive ones of said set fingers into a punch actuating position as said relative movement is effected.

17. The apparatus of claim 13 wherein said memory finger sensing and punch actuating unit includes a helical cam movably mounted in alignment with said set fingers and successively shiftable by limited abutment with successive ones of said set fingers into a punch actuating position as said relative indexing and shifting movement is effected.

18. The apparatus of claim 13 further including a plurality of memory finger setters corresponding in number to the number of memory fingers in one of said fields, said setters being restrained from movement relative to said punch and unit in the direction of said card edge and being selectively movable in accordance with said code inputs into finger setting engagement relative to said fingers thereby selectively setting in accordance with said code inputs desired ones of said fingers on a field-by-field basis as said relative field-by-field indexing and shifting motion is effected.

19. The apparatus of claim 18 further including a coder having a plurality of code keys, each of said code keys being connected to at least two of said plurality of memory finger setters, said keys being operative upon actuation to set the fingers of a given one of said fields in accordance with said code inputs corresponding to the particular one of said keys actuated, thereby enabling said fields of fingers to be sequentially notched in accordance with the code key actuated in each field.

20. The apparatus of claim 19 wherein said punch is rotatably mounted and further comprising:
a continuously operating drive motor having a rotatable output drive shaft; and
a clutch selectively coupling said drive shaft and said rotatably mounted punch, said clutch being linked to said cam and rendered engageable driving said punch in response to said shifting of said cam when said cam abuts said set fingers.

21. The apparatus of claim 20 further including an axially shiftable second shaft mounted for rotation and coupled to said punch, wherein said cam is fixed to said second shaft and wherein said clutch includes a first clutch plate fixed to said drive shaft and a second clutch plate fixed to said second shaft and normally spaced from and disengaged with said first clutch plate, said second clutch plate being shiftable into engagement with said first clutch plate when said cam abuts said set fingers thereby transmitting rotary notching motion from said motor to said punch through said clutch and said shafts.

22. The apparatus of claim 21 further including a memory finger resetter selectively movable into resetting engagement with said set memory fingers, thereby selectively resetting said set memory fingers.

23. The apparatus of claim 22 wherein said finger support is pivotably and slidably mounted along an edge parallel to said record edge, said support being pivotal to thereby effectively misalign said cam and said set fingers and enable said support to freely slide parallel to said record edge.

24. The apparatus of claim 23 wherein said resetter is selectively movable into a finger reset enabling position when said cam and fingers are misaligned thereby resetting said fingers as said support is pivotally returned aligning said cam and said fingers.

25. The apparatus of claim 24 wherein said indexer further includes a toothed bar having teeth corresponding to said fields and a detent, one of said bar and detent being fixed relative to said record holder and the other of said bar and detent being fixed relative to said punch, said bar and detent being selectively engageable when said cam and fingers are aligned, thereby enabling selective setting of said memory fingers as relative field-by-field indexing and shifting motion is effected by the engagement of said detent and successive ones of said teeth.

26. A memory finger support for independently slidably supporting a plurality of elongated memory fingers in parallel juxtaposed contiguous relationship, comprising:
first and second finger positioners each having cooperating mating surfaces provided with a row of finger positioning slots having uniform slot widths and uniform slot spacings, said spacings being equal, said positioners being fixed relative to each other with said mating surfaces in opposed relationship and with said rows parallel and the slots and spaces of said first positioner aligned with the spaces and slots of said second positioner, respectively.

27. Apparatus comprising:
a continuously rotating driving shaft;
a rotatably and axially slidable driven shaft;
a clutch comprising a first clutch plate fixed to said driving shaft and a second clutch plate fixed to said driven shaft and normally biased out of engagement with said first clutch plate, a helical cam fixed to said driven shaft, and a clutch engaging cam follower axially movable relative to said shafts and selectively engageable with said helical cam to axially shift said cam and driven shaft thereby engaging said clutch plates and rotating said cam and driven shaft for a period coextensive with the axial advancement of said cam follower relative to said cam.

28. Apparatus for selectively notching fields of notch sites located along the edge of a record in accordance with a predetermined code comprising:
a record holder;
a plurality of juxtaposed notching punches positioned in site notching disposition with respect to said edge of a record held by said record holder and selectively actuable in response to code inputs, said plurality corresponding numerically to the number of notch sites in a field and defining a notching station, said plurality of punches each having pairs of flat parallel lateral surface regions defining an edge, said edges of said punches having aligned transverse slots therein cooperable with adjacent punches to produce notches, said slots defining said notching station for receiving adjacent notch sites of a field; and
an indexer interconnecting and shifting said record holder and said plurality of notching punches in relatively movable field-by-field indexing and shifting relationship, thereby enabling different ones of said plurality of notching punches to notch correspondingly different ones of said notch sites of said fields in accordance with said code inputs as said indexer effects relative field-by-field indexing and shifting movement between said plurality of notching punches and said fields of notch sites.

29. The apparatus of claim 28 further including a plurality of notching punch actuators selectively operable in response to code inputs and corresponding in number and connected to said plurality of notching punches in punch actuating relationship thereby enabling different ones of said notching punches to move into site notching relationship with their associated notch sites producing selective notching of said sites in accordance with said code inputs to said actuators.

30. The apparatus of claim 29 wherein said indexer includes a toothed bar and a detent which jointly effect said relative indexing and shifting movement by sequential engagement of said detent and different ones of said teeth.

31. The apparatus of claim 30 wherein said sequential engagement is effected by reciprocating transverse relative movement between said detent and said toothed bar.

32. The apparatus of claim 31 further including a record holder guide having a record holder guiding surface parallel to said juxtaposed notching punches and in record holder guiding relationship with said record holder, thereby positioning and guiding said record edge in notching relationship with said punches as said record edge transverses said notching station.

33. The apparatus of claim 32 wherein said record holder guide includes a bar slidably connected to said record holder.

34. The apparatus of claim 33 wherein said actuators include electromechanical transducers having movable drive members drivingly coupled to said notching punches and wherein said code inputs are electrical signals, thereby enabling said notching punches to notch said record edge in response to electrical code signal inputs to said transducers.

35. The apparatus of claim 34 wherein pivotally mounted levers mechanically connecting said drive members and said notching elements drivingly couple said drive members and said notching elements.

36. Apparatus for selectively notching notch sites of fields located along the edge of a record in accordance with a predetermined code, said apparatus comprising:
a plurality of notching punches corresponding in number to said notch sites of said fields, said notching punches having lateral surfaces defining edges, said edges having aligned transverse slots therein of predetermined depth which receive notch sites of said fields, said punches being selectively shiftable misaligning said slots in response to code inputs thereby cooperating with adjacent punches to produce notches of said predetermined depth at selected ones of said notch sites of said fields in accordance with said code inputs.

37. The apparatus of claim 36 wherein said lateral surfaces of said punches are parallel and wherein adjacent punches are positioned in die forming relationship relative to each other.

38. Apparatus for selectively notching fields of notch sites located along the edge of a record in accordance with a predetermined code comprising:
   a record holder;
   a site notching punch selectively actuable in response to code inputs, said site notching punch being mounted in site notching relationship with said record edge thereby notching a notch site properly registered with said punch in response to a code input; and
   an indexer including an array of fields of memory fingers and a finger support fixed to said card holder, said memory fingers being elongated and mounted independently and slidably between a set and reset position in said support in an aligned-by-row and offset-by-column skewed matrix configuration, the number of fingers in said columns corresponding to the number of said notch sites in each of said fields, the number of said columns corresponding to the number of said fields, and the offset distance of said fingers corresponding to the width of said notch site, said indexing mechanism further including a memory finger sensing and punch actuating unit fixed relative to said punch and actuable to notch a notch site in response to the sensing of a memory finger set in accordance with said code inputs, said indexer interconnecting and shifting said record holder and said punch in relatively movable record indexing and shifting relationship enabling the notch sites corresponding to said set memory fingers to be notched by said punch in response to the sequential sensing of said memory fingers set in accordance with said code inputs as said relative indexing and shifting movement is effected.

39. The apparatus of claim 38 wherein said support includes a plate having finger guiding and supporting apertures located at positions corresponding to said row and column configuration, and said support further including a finger lock slidably mounted to said plate and shiftable between a set-finger motion inhibiting position and a set-finger motion permitting position.

40. The apparatus of claim 39 wherein said indexer further includes a toothed bar having teeth corresponding to said fields and having a detent, one of said bar and detent being fixed relative to said record holder and the other of said bar and detent being fixed relative to said punch, said bar and detent being selectively engageable, thereby enabling selective setting of said memory fingers in accordance with said code inputs as relative field-by-field indexing and shifting motion is effected by the engagement of said detent and successive ones of said teeth.

41. The apparatus of claim 38 wherein said indexer further includes a toothed bar having teeth corresponding to said fields and having a detent, one of said bar and detent being fixed relative to said record holder and the other of said toothed bar and detent being fixed relative to said punch and selectively engageable with said one of said bar and detent, thereby enabling selective setting of said memory fingers in response to said code inputs as relative field-by-field indexing and shifting motion is effected by the engagement of said detent and successive ones of said teeth, and wherein said memory finger sensing and punching unit includes a lever movably mounted in alignment with said set fingers and successively shiftable by limited abutment with successive ones of said set fingers into a punch actuating position as said relative indexing and shifting movement is effected.

42. The apparatus of claim 38 further including a plurality of memory finger setters corresponding in number to the number of memory fingers in one of said fields, said setters being restrained from movement relative to said punch and unit in the direction of said card edge and being selectively moveable in response to said code inputs into finger setting engagement relative to said fingers thereby selectively setting in accordance with said code inputs desired ones of said fingers on a field-by-field basis as said relative field-by-field indexing and shifting motion is effected.

43. The apparatus of claim 42 further including a plurality of code keys, each of said code keys being connected to at least two of said plurality of memory finger setters, said keys being oterative upon actuation to set the fingers of a given one of said fields in accordance with said code inputs corresponding to the particular one of said keys actuated, thereby enabling said fields of fingers to be sequentially notched in accordance with the code key actuated in each field.

44. The apparatus of claim 42 wherein said memory finger sensing and punching unit includes a lever movably mounted in alignment with said set fingers and successively shiftable by limited abutment with successive ones of said set fingers into a punch actuating position as said relative indexing and shifting movement is effected.

45. The apparatus of claim 44 wherein said punch is rotatably mounted and further comprising:
   a continuously operating drive motor having a rotatable output drive shaft; and
   a clutch selectively coupling said drive shaft and said rotatably mounted punch, said clutch being linked to said lever and rendered engageable driving said punch in response to said shifting of said lever into said punch actuating position when said lever abuts said set fingers.

46. The apparatus of claim 45 further including a second shaft mounted for rotation and coupled to said punch and wherein said clutch includes a first clutch plate fixed to said drive shaft and a second clutch plate fixed to said second shaft and normally spaced from and disengaged with said first clutch plate, said second clutch plate being shiftable into engagement with said first clutch plate when said lever abuts said set fingers thereby transmitting motion from said motor to said punch through said clutch and said shafts.

47. The apparatus of claim 46 wherein said support includes a plate having finger guiding and supporting apertures located at positions corresponding to said row and column configuration, and said support further including a finger lock slidably mounted to said plate and shiftable between a set-finger motion inhibiting position and a set-finger motion permitting position, said apparatus further including a memory finger resetter selectively movable into lock shifting engagement with said lock thereby shifting said lock into said set-finger motion permitting position and resetting said set fingers as said relative movement is effected.

48. The apparatus of claim 47 wherein said finger support is slidably mounted along an edge parallel to said rows, and wherein said lever is biased against said set fingers and has a set-finger sensing end camable out of engagement with said set fingers as said support slides in a specified non-notching direction.

49. The apparatus of claim 48 wherein said indexer further includes a toothed bar having teeth corresponding to said fields and a detent, one of said bar and detent being fixed relative to said record holder and the other of said bar and detent being fixed relative to said punch, said bar and detent being selectively engageable thereby enabling selective setting of said memory fingers in response to said code inputs as relative field-by-field indexing and shifting motion is effected by the engagement of said detent and successive ones of said teeth.

50. A memory unit comprising
   a plurality of fingers;
   a plate having finger supporting and guiding apertures arranged in an aligned-by-row and offset-by-column skewed matrix configuration, a plurality of biasing elements each connected between said plate and different ones of said fingers and biasing said fingers into a reset position, a lock movable relative to said fingers between set-finger motion enabling position and a set-finger motion inhibiting position thereby permitting said fingers to be selectively reset by moving said lock relative to said fingers.

51. Apparatus for selectively notching fields of notch sites located along the edge of a record in accordance with a predetermined code comprising:
holding means for holding a record to be notched;
notching means for notching a notch site;
memory means having one storage element for each notch site for storing coded information representative of the notch sites of each field to be notched;
means for sequentially sensing said storage elements and actuating said notching means in accordance with said stored information; and
means for producing relative motion between said holding means and said notching means for indexing said notch sites past said notching means, thereby enabling desired ones of said notch sites to be sequentially notched in accordance with said stored information.

52. Apparatus of claim 51 wherein said memory means and holding means are fixed relative to each other and wherein said relative motion producing means also relatively moves said holding and notching means for indexing said memory means past said sensing station, and further comprising a keyboard for converting keyboard inputs to said code inputs, said code inputs being stored in said memory means for controlling the actuation of said notching means to thereby produce a record notched in accordance with said keyboard inputs.

53. The apparatus of claim 52 further including selectively operable means for erasing said memory.

54. The apparatus of claim 52 wherein said storage elements comprise elongated memory fingers, said memory fingers being mounted independently and slidably between a set and reset position in a support in an aligned-by-row and offset-by-column skewed matrix configuration, the number of fingers in said columns corresponding to the number of said notch sites in each of said fields, the number of said columns corresponding to the number of said fields, and the offset distance of said fingers corresponding to the width of said notch site; and wherein said sensing and punch actuating means includes a lever movably mounted in alignment with said set fingers and successively shiftable by limtied abutment with successive ones of said set fingers into a punch actuating position as said relative movement is effected.

55. The apparatus of claim 53 wherein said storage elements comprise elongated fingers independently and slidably mounted in parallel juxtaposed relationship in a slotted finger support, said fingers being shiftable in response to said code inputs between a set position and a reset position; and wherein said sensing and punch actuating unit comprises a helical cam movably mounted in alignment with said set fingers and successively shiftable by limited abutment with successive ones of said set fingers into a punch actuating position as said relative indexing and shifting movement is effected.

56. A method of selectively notching fields of notch sites located along the edge of a record in accordance with a predetermined code comprising the steps of:
positioning said record edge in site notching disposition relative to a site notching punch selectively operable in response to code inputs identifiable with specified different ones of said sites;
producing relative indexing and shifting motion between said sites of said record edge and said punch, and between said punch and a code storage device;
storing code inputs identifiable with specified different ones of said sites in said storage device in synchronism with said relative indexing and shifting motion; and
feeding said stored code inputs from said storage device to said punch in synchronism with relative movement of said storage device and said punch and record edge, thereby selectively actuating said punch and notching said sites in accordance with said code inputs.

57. The method of claim 56 wherein said storing step includes shifting memory fingers comprising said storage elements and aligned in a row parallel to said edge from a reset position to a set position, and wherein said feeding step includes sequentially mechanically sensing set fingers and sequentially actuating said punch in response thereto, thereby notching said sites identifiable with said stored and sensed code inputs.

58. The method of claim 56 further including the steps of actuating keys of a keyboard coding unit, thereby generating said code inputs.

59. The method of claim 58 wherein said actuating of said keys and said storing of said code inputs identifiable with said sites is on a field-by-field basis thereby enabling usage of a single set of keys repetitively as code inputs are entered on a field-by-field basis.

60. The method of claim 56 wherein said storing and feeding steps occur during successive relative movements of said storage device and said punch and record edge, thereby completing said storage step prior to initiating said feeding step.

61. The method of claim 56 wherein said storing and feeding steps occur substantially concurrently during the same relative motion producing step.

62. Apparatus for selectively notching fields of notch sites located along the edge of a record in accordance with a predetermined code comprising:
a record holder;
a selectively actuable site notching punch positioned in notching disposition with respect to said edge of a record held by said record holder;
a memory unit fixed relative to said record holder and having storage elements corresponding in number to said notch sites;
a storage element code entry unit having selectively operable storage element entry devices, said unit being disposed in relatively movable relationship with respect to said memory unit, said entry devices numbering less than the number of storage elements;
a storage element sensing and punch actuating unit in storage element sensing relationship with said storage elements and operatively associated with said punch to actuate said punch in accordance with sensed code input; and
an indexer interconnecting and shifting said record holder, memory, punch, and code entry unit in relatively movable indexing and shifting relationship, thereby enabling said storage element entry devices to store code inputs in said memory unit and said stored code inputs to be sensed and said punch actuated by said sensing and punch actuating element to selectively notch said edge in accordance with said sensed code inputs as said indexer effects relative indexing and shifting motion.

63. Apparatus for selectively notching notch sites of fields located along the edge of a record in accordance with a predetermined code, said apparatus comprising:
a plurality of notching punches corresponding in number to said notch sites of said fields, each of said notching punches having parallel lateral surface regions defining an edge, said edges having aligned transverse slots therein of predetermined depth which receive notch sites of said field and which are cooperable with adjacent punches to produce notches of said predetermined depth in said record edge.

(References on following page)

References Cited

UNITED STATES PATENTS

| | | | |
|---|---|---|---|
| 2,041,085 | 5/1936 | Nevin | 234—48 |
| 2,261,710 | 11/1941 | Andrews | 234—48 |
| 2,294,371 | 9/1942 | Andrews | 234—48 |
| 2,585,720 | 2/1952 | Anderson | 234—47 |
| 2,704,578 | 3/1955 | Feiertag | 234—47 X |
| 2,762,434 | 9/1956 | Smusz | 234—48 X |
| 3,006,537 | 10/1961 | Gassino et al. | 234—55 X |
| 3,231,186 | 1/1966 | Cross | 234—48 |

WILLIAM S. LAWSON, Primary Examiner

U.S. Cl. X.R.

234—48, 57, 58

PO-1050
(5/69)

UNITED STATES PATENT OFFICE
CERTIFICATE OF CORRECTION

Patent No. 3469774          Dated September 30, 1969

Inventor(s) Robert J. Kalthoff, Frederic R. G. Sanborn, and Robert D. Parry

It is certified that error appears in the above-identified patent and that said Letters Patent are hereby corrected as shown below:

Column 37, line 53, (Claim 11) after "properly" insert --registered--.

Column 39, line 25, (Claim 22) change "momory" to --memory--.

Column 42, line 14, (Claim 43) change "oterative" to --operative--.

Column 44, line 18, (Claim 58) change "steps" to --step--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents